(12) United States Patent
Bays

(10) Patent No.: US 7,139,242 B2
(45) Date of Patent: Nov. 21, 2006

(54) METHODS, APPARATUSES AND SYSTEMS FACILITATING DEPLOYMENT, SUPPORT AND CONFIGURATION OF NETWORK ROUTING POLICIES

(75) Inventor: Robert James Bays, San Francisco, CA (US)

(73) Assignee: Proficient Networks, Inc., San Francisco, CA (US)

( * ) Notice: Subject to any disclaimer, the term of this patent is extended or adjusted under 35 U.S.C. 154(b) by 1233 days.

(21) Appl. No.: 10/027,429

(22) Filed: Dec. 19, 2001

(65) Prior Publication Data

US 2002/0141343 A1    Oct. 3, 2002

Related U.S. Application Data

(63) Continuation-in-part of application No. 09/820,465, filed on Mar. 28, 2001.

(51) Int. Cl.
*H04L 12/28* (2006.01)
(52) U.S. Cl. .................. 370/238; 370/392; 370/400
(58) Field of Classification Search ............... 709/241
See application file for complete search history.

(56) References Cited

U.S. PATENT DOCUMENTS

| | | | |
|---|---|---|---|
| 5,596,719 A | 1/1997 | Ramakrishnan et al. | |
| 5,687,372 A | 11/1997 | Hotea et al. | |
| 5,870,464 A | 2/1999 | Brewster et al. | |
| 5,881,243 A | 3/1999 | Zaumen et al. | |
| 5,884,043 A | 3/1999 | Teplitsky | |
| 5,917,821 A | 6/1999 | Gobuyan et al. | |
| 5,940,372 A * | 8/1999 | Bertin et al. | 370/238 |
| 6,058,422 A | 5/2000 | Ayanoglu et al. | |
| 6,078,652 A | 6/2000 | Barak | |
| 6,104,701 A | 8/2000 | Avargues et al. | |
| 6,577,600 B1 * | 6/2003 | Bare | 370/238 |
| 6,618,761 B1 * | 9/2003 | Munger et al. | 709/241 |
| 6,788,686 B1 * | 9/2004 | Khotimsky et al. | 370/394 |
| 7,027,448 B1 * | 4/2006 | Feldmann et al. | 370/401 |

OTHER PUBLICATIONS

Govindan et al., *Heuristics for Internet Map Discovery*, USC Information Sciences Institute.
Siamwalla et al., *Discovering Internet Topology*, Cornell Network Research Group.

* cited by examiner

*Primary Examiner*—Huy D. Vu
*Assistant Examiner*—Roberta A. Shand
(74) *Attorney, Agent, or Firm*—Mark J. Spolyar

(57) ABSTRACT

Methods, apparatuses and systems relating to the control and application of policies for routing data over a computer network, such as the Internet. Some implementations of the invention facilitate the configuration, deployment and/or maintenance of network routing policies. Some implementations of the invention are particularly useful for controlling the routing of data among autonomous systems or organizations. Certain implementations allow for dynamic modification of routing policy based on such factors as current Internet performance, load sharing, user-defined parameters, and time of day.

30 Claims, 23 Drawing Sheets

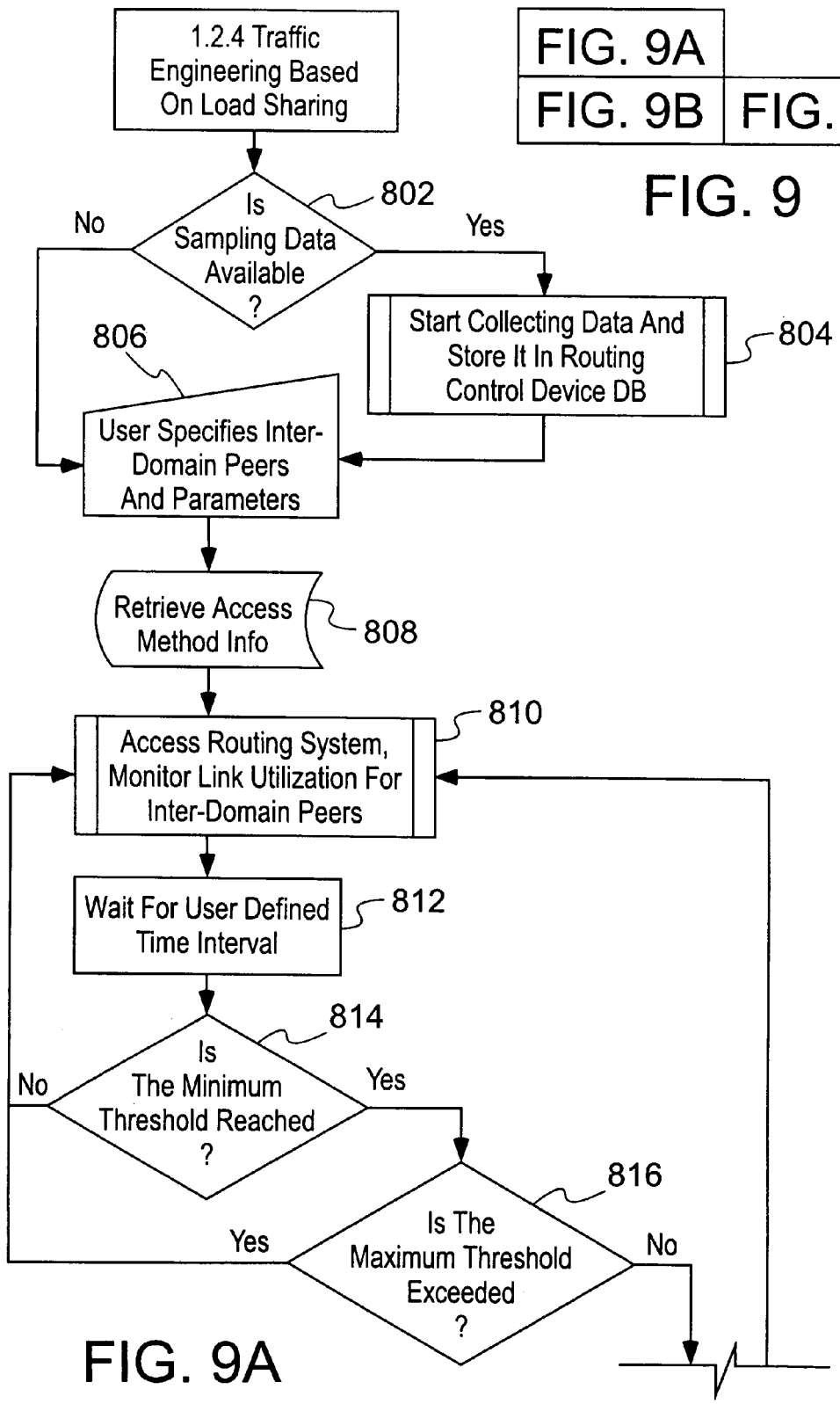

| Network Prefix | Next Hop | AS Path | Bytes |
|---|---|---|---|
| 1.0.0.0/24 | 1.1.1.1 | AS1, AS45, AS79 | 100Mb |
| | 2.2.2.2 | AS2, AS45, AS79 | |
| | 3.3.3.3 | AS3, AS79 | |
| 2.0.0.0/24 | 1.1.1.1 | AS1, AS7, AS54 | 50Mb |
| | 3.3.3.3 | AS3, AS5, AS11, AS62, AS54 | |
| 3.0.0.0/24 | 2.2.2.2 | AS2, AS8 | 35Mb |
| ... | | | |
| ... | | | |

FIG. 12

| Next Hop | | | |
|---|---|---|---|
| 1.1.1.1 | 1.0.0.0/24 | 2.0.0.0/24 | ... |
| 2.2.2.2 | 1.0.0.0/24 | | ... |
| 3.3.3.3 | 1.0.0.0/24 | 2.0.0.0/24 | 3.0.0.0/24 | ... |

FIG. 13

METHODS, APPARATUSES AND SYSTEMS FACILITATING DEPLOYMENT, SUPPORT AND CONFIGURATION OF NETWORK ROUTING POLICIES

RELATED APPLICATION

The present application claims priority from co-pending and commonly owned U.S. application Ser. No. 09/820,465, filed Mar. 28, 2001 and entitled "Methods, Apparatuses and Systems Facilitating Deployment, Support and Configuration of Network Routing Policies," which is incorporated by reference herein in its entirety for all purposes.

FIELD OF THE INVENTION

The present invention relates to computer networks and, more particularly, to methods, apparatuses and systems facilitating the configuration, deployment and/or maintenance of network routing policies.

BACKGROUND OF THE INVENTION

The Internet is expanding rapidly in terms of the number of interconnected organizations or autonomous systems and the amount of data being routed among such organizations or systems. This growth affects the performance and reliability of data transfer, among Internet Service Providers, between enterprise service providers, within enterprise networks. One of the most difficult and important aspects of modern networking is properly deploying and maintaining routing policies for the routing of data among the ever-increasing number of autonomous systems and organizations. Sub-optimal Internet connectivity can lead to a poorly or inconsistently performing web site, adversely affecting a company's brand and reputation.

Border Gateway Protocol (BGP), the standard inter-domain routing protocol, has proven to be notoriously difficult to initially configure and even more complicated to correctly support. Furthermore, the concept of Autonomous Systems (ASs), which is integral to the protocol, hides routing metrics from the end systems resulting in sub-optimal routing decisions. The AS Path metric, which is an enumeration of the set of autonomous systems that a data packet travels through, is the primary metric BGP uses to select best path. This metric assumes that the shortest AS path metric is the best route to a given destination network; however, given the ever-increasing expansion of the Internet and the wide array of devices connected thereto, the AS Path metric is often not a very good predictor of the best path to a given destination network. Indeed, the default BGP metric does not account for other factors affecting routing path performance, such as link utilization, capacity, error rate or cost, when making routing decisions. In addition, BGP, version 4 (BGP4), the current BGP version, does not allow for adjustments necessitated by the consolidation that has taken and is currently taking place within the industry that has resulted in the collapse of smaller, formerly discrete networks into expansive, single autonomous networks. Consequently, the default BGP4 configuration often leads to poor network performance and creates reliability issues for many organizations.

In light of the foregoing, a need in the art exists for methods, apparatuses and systems that address the issues presented by configuration and deployment of inter-domain routing policies. In addition, a need further exists for methods, apparatuses and systems that allow for augmentation of current routing policy metrics with more intelligent ones, leading to better routing decisions.

SUMMARY OF THE INVENTION

The present invention relates to a system for controlling or applying policies for routing data over a computer network, such as the Internet. Some implementations of the invention facilitate the configuration, deployment and/or maintenance of network routing policies. Some implementations of the invention are particularly useful for controlling the routing of data among autonomous systems or organizations. Certain implementations allow for dynamic modification of routing policy based on such factors as current Internet performance, load sharing, user-defined parameters, and time of day.

DESCRIPTION OF THE DRAWINGS

FIG. 12 provides, for didactic purposes, a network prefix dataset, ordered relative to traffic load to the network prefix, and including next hop and AS path data for each network prefix.

FIG. 13 provides, for didactic purposes, a nexthop table including nexthop queues for the routing peers associated with the first computer network, based on the data provided in table 12.

DESCRIPTION OF PREFERRED EMBODIMENT(S)

Figure 1:
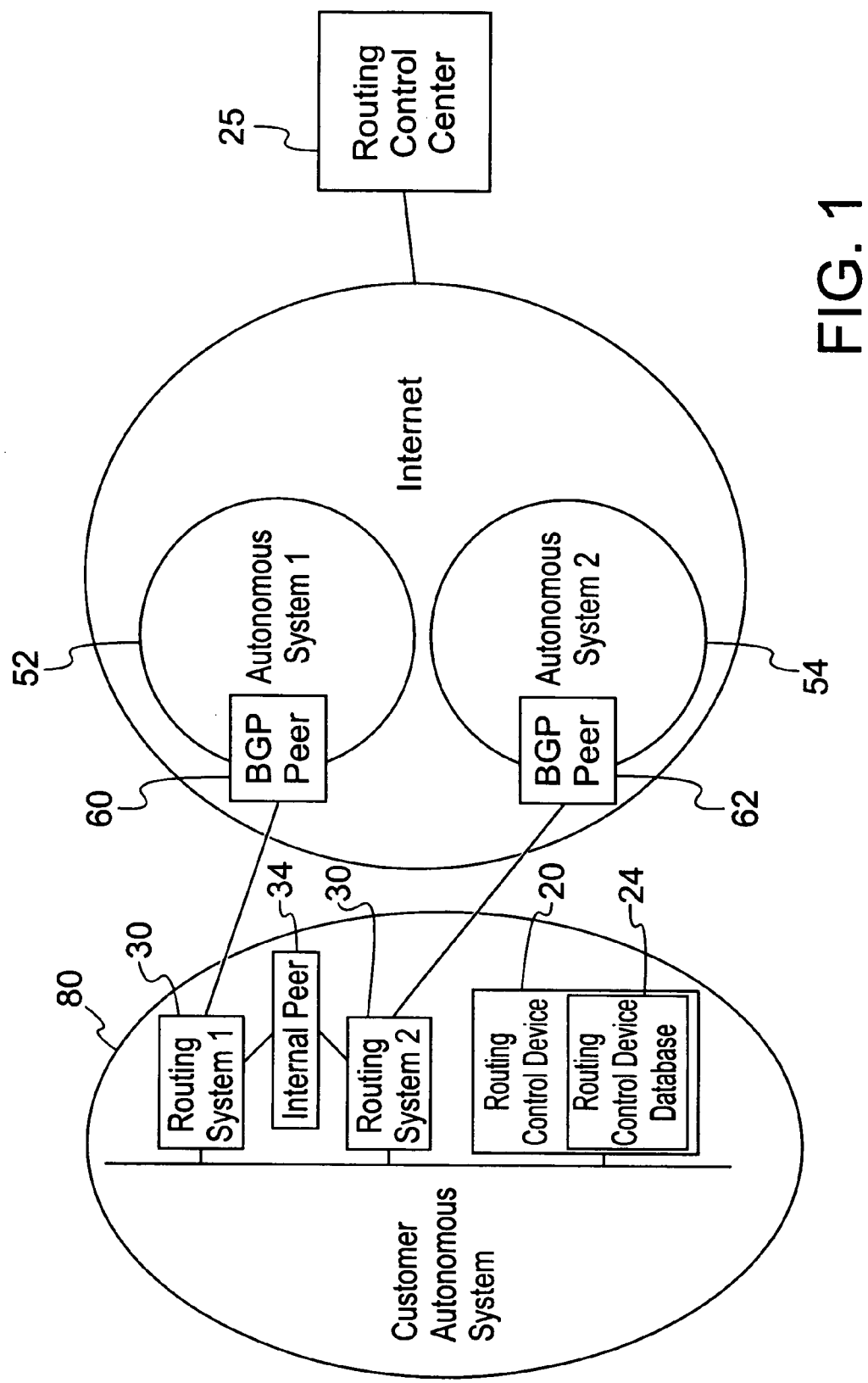
FIG. 1 is a functional block diagram illustrating a computer network environment and one embodiment of the present invention.

Certain embodiments of the present invention involve a routing control device 20 that can be deployed within a network environment and used to manipulate routing policy implemented by routing systems 30 (e.g., applying path preferences to routing systems). In some embodiments the routing control device 20 is an Internet appliance and, in some embodiments, routing control device 20 obtains routing path information and modifies the operation of associated routing systems 30. In some embodiments, a central server 40 in connection with a plurality of data collectors 90 obtains path information for use by one or more routing policy control devices 20 (see FIG. 2). As described below, the functionality described herein can be deployed in a variety of configurations from stand-alone Internet appliances to centrally and virtually managed services.

FIG. 1 illustrates a computer network environment including an embodiment of the present invention. As FIG. 1 illustrates, the computer network environment includes autonomous systems 52 and 54, each of which are a single network or a collection of networks under a common administrative policy and registration. In one embodiment, routing control device 20 is operably coupled to at least one routing system 30 within a customer autonomous system 80. The computer network environment, in one embodiment, also includes routing control center 25 providing a centralized point of administration and/or access to one or more routing control devices 20.

As FIG. 1 illustrates, routing control device 20 operates in connection with routing control device database 24. Routing control device database 24 may be an integral part of routing control device 20 or, in other forms, may reside in a separate database server. In one form, routing control device database 24 includes routing control device configuration data, configuration policies, routing system rule sets, and test results (e.g., routing path metrics and/or traffic data). In one form, routing control device database 24 includes routing system profiles for each routing system connected to routing control device 20.

Figure 2:
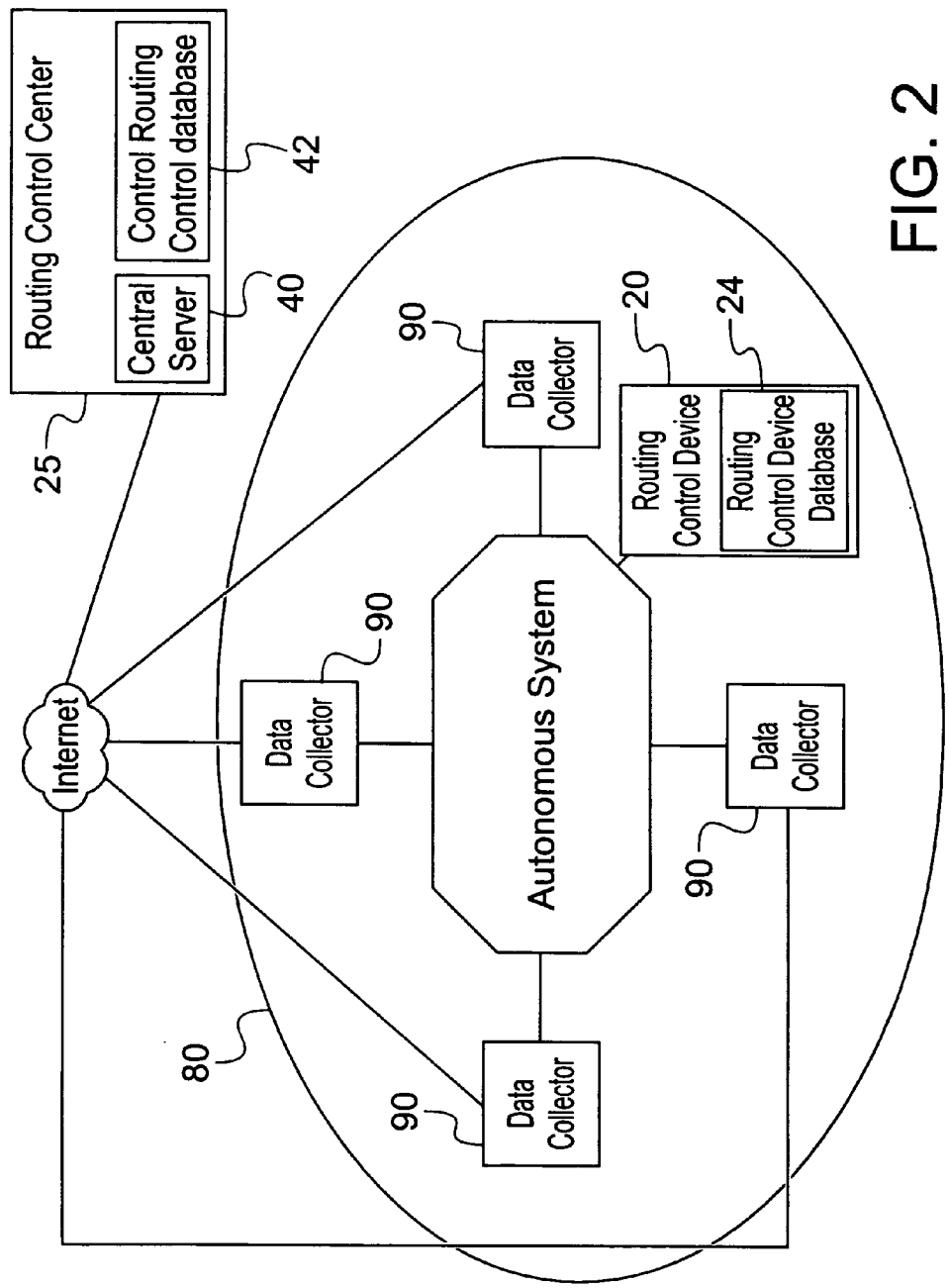
FIG. 2 is a functional block diagram illustrating a computer network environment and an embodiment of the present invention utilizing a central server and data collector system.

FIG. 2 illustrates a system providing a centralized source for Internet routing policy. The system, in one embodiment, comprises a central server 40 operably connected to a plurality of data collectors 90 within an autonomous system 80. Although only one autonomous system 80 is shown, sets of data collectors 90 may be deployed on multiple autonomous systems, respectively. Operation of the central server 40 and the data collectors 90 is described in more detail below.

1.0 Functionality

The following describes the functionality of an embodiment of the present invention.

Figure 3:
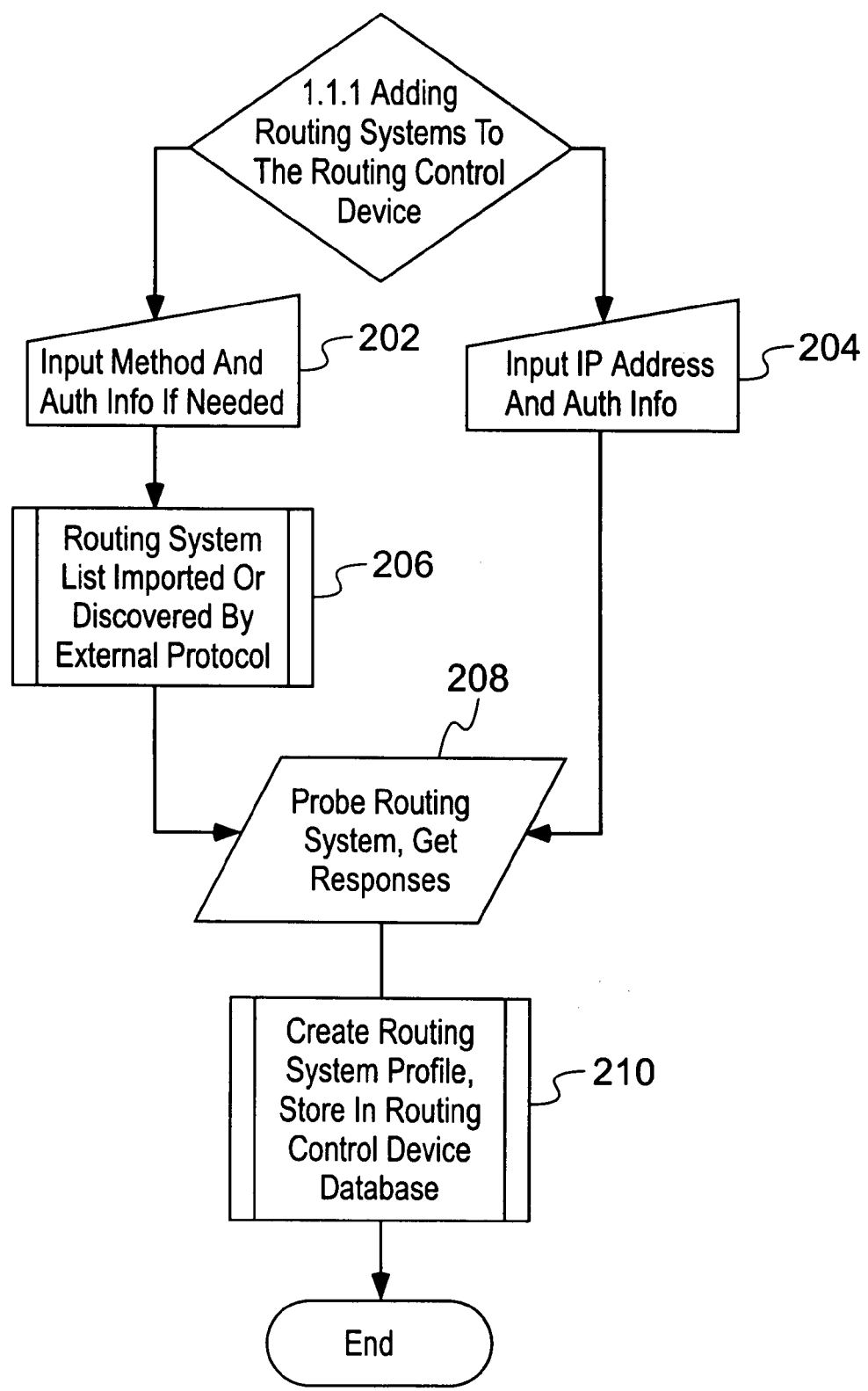
FIG. 3 is a flow chart diagram illustrating a method for adding a routing system to a routing control device according to one embodiment of the invention.

1.1 Routing Policy Configuration 1.1.1 Adding Routing Systems to the Routing Control Device A routing system 30 is any machine capable of routing data between two networks and sharing network layer reachability information between one or more routing systems. In one embodiment, routing systems 30 share network layer reachability information via BGP. The user may add routing systems 30 to routing control device 20 by supplying the IP address or fully qualified domain name of a primary interface and access authority information for the routing system (FIG. 3, step 204). Optionally, routing control device 20 may import a set of routing systems from an external source or via a system discovery protocol (FIG. 3, step 206). A primary interface is one that has a known IP address or a fully qualified domain name assigned for the duration of the life of the routing system. Access authority information usually consists of a user name, password combination but may contain other necessary information for a specific authentication protocol and should be supplied for each type of access method supported by routing control device 20 (see step 202). Access methods include Simple Network Management Protocol (SNMP) queries, interactive sessions to terminal interfaces, and other proprietary access protocols. The routing system 30 is initially probed using the supplied access method to determine system wide parameters such as make and model of the routing system (FIG. 3, step 208). The routing system 30 may be probed using multiple access methods as required to obtain the system wide parameters. After all routing system responses have been collected, a routing system profile consisting of the user supplied information combined with probe responses is stored in routing control device database 24 (FIG. 3, step 210).

1.1.2 Defining Network Routing Policy Configuration

Routing control device 20 includes a predefined or default routing policy configuration, called the default device configuration policy. In one embodiment, the default routing policy configuration is stored in routing control device database 24. This set of routing policies defines a default configuration rule set that determines how inter-domain routing should be configured based on current industry best practices. All actions routing control device 20 makes are directly or indirectly based on this default configuration rule set. The user can update the default device configuration policy periodically by querying a central server (e.g., such as a server located at routing control center 25) and downloading the latest default device configuration policy, if desired. The user can further modify the default device configuration policy to apply customized network wide configuration parameters by supplying the requested policy as a local configuration policy that is input to routing control device 20 using a graphical interface, a configuration file, or a command line interface. This local configuration policy is checked for errors based on the specifications of the default device configuration policy. The local configuration policy is then saved in routing control device database 24, overwriting any previously saved local configuration policies. Each time routing control device 20 is powered on it reads the local configuration policy from routing control device database 24 and if it exists, combines it with the default configuration policy. This combined policy becomes the primary configuration policy for routing control device 20. In one embodiment, a user may specify a local configuration policy for each routing system 30; routing control device 20 therefore generates a primary configuration policy for each routing system 30.

1.1.3 Applying Routing Policy Configurations to Routing Systems

Routing control device 20 enforces the primary configuration policy on any routing system 30 for which it is requested to control. When a routing system is added, routing control device 20 checks the routing system rule set for inconsistencies with the primary configuration policy and changes the routing system rule set to be consistent with the primary configuration policy for routing control device 20.

Figure 4:
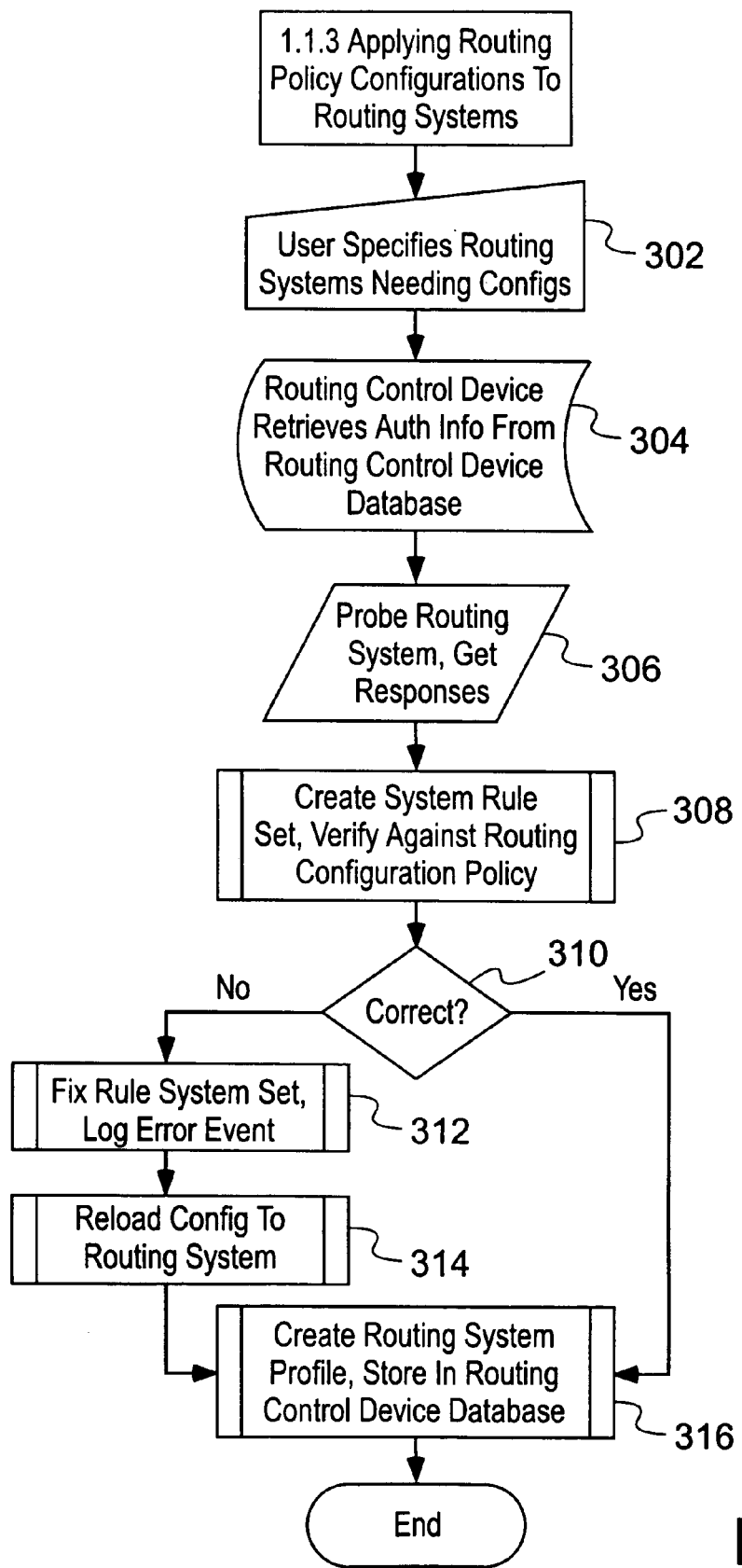
FIG. 4 is a flow chart diagram setting forth a method for applying a routing policy configuration to one or more routing systems.

In particular and in one embodiment, once a routing system has been added to routing control device 20 initially, the routing system 30 must be configured. Subsequent changes in the primary device configuration policy may also require the routing system 30 to be reconfigured. To do this, the user specifies the routing system(s) 30 to be configured (FIG. 4, step 302). Query methods and access authority information are retrieved for the corresponding IP addresses or fully qualified domain names from routing control device database 24 (step 304). Routing control device 20 then queries the routing systems 30 to assemble a current routing system configuration for each routing system 30 using the appropriate query method (step 306). The retrieved routing system configuration is interpreted to define the current BGP peering setup as a rule set per routing system called a system rule set (step 308). This system rule set includes the entire data set of configuration information for the peers such as IP addresses, autonomous systems, filters, descriptions, and peering options. If the retrieved system rule set is in conflict with the primary device configuration policy of routing control device 20, routing control device 20 logs an error, fixes the system rule set (step 312), and applies the updated system rule set to the routing system 30 (step 314). The finalized system rule set is stored in the routing control database 24 for later retrieval (step 316). Parameters in the system rule set may be translated into user-friendly names using a proprietary database of information. For example routing control device 20 may map autonomous system numbers to network names.

1.1.4 Removing a Routing System from the Routing Control Device

Figure 5:
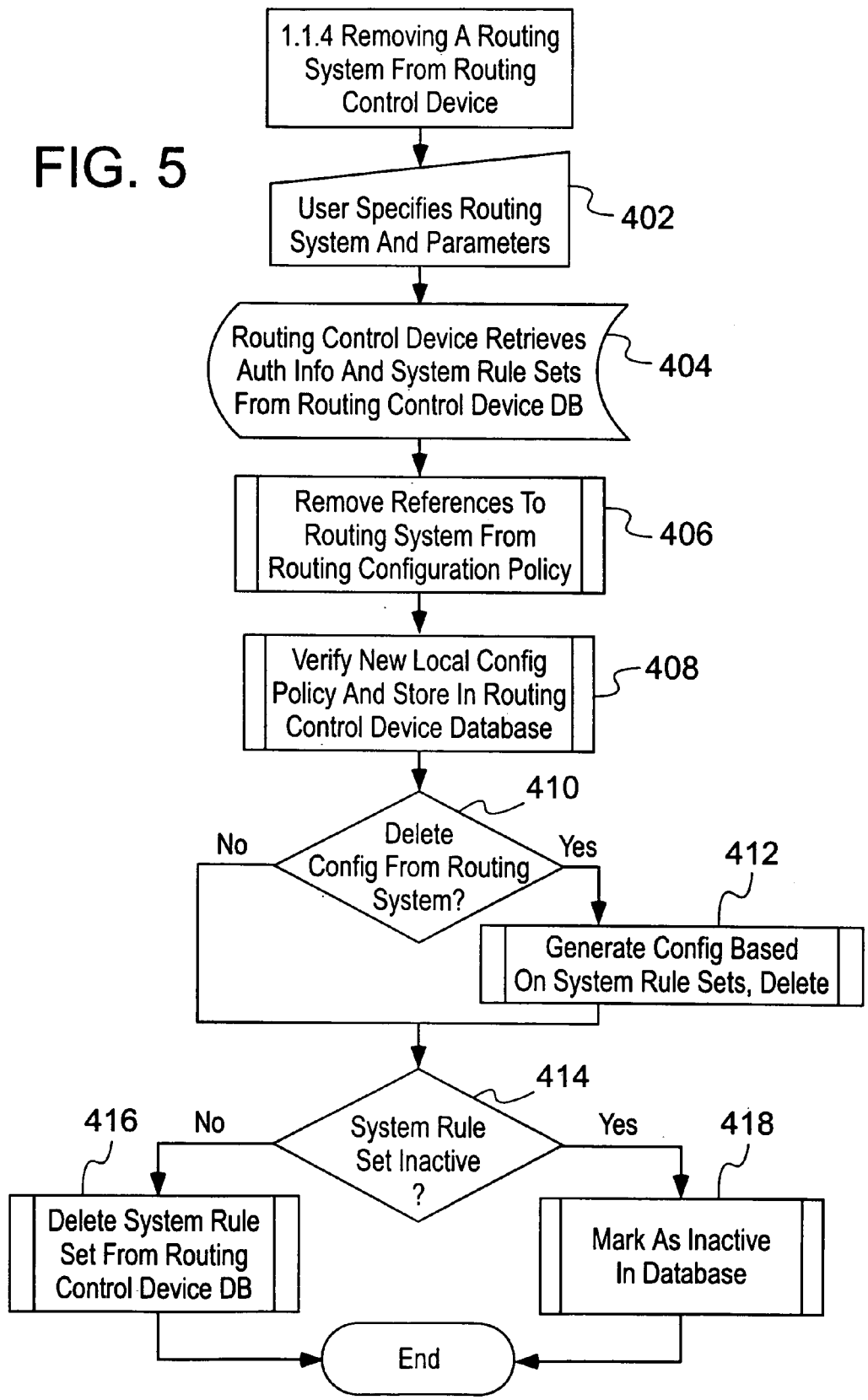
FIG. 5 is a flow chart diagram providing a method for removing a routing system.

The user identifies the routing system to be removed from routing control device 20 (FIG. 5, step 402). Routing control device 20 retrieves access authority information and system rule sets from routing control device database 24 (step 404). Routing control device 20 removes all references to the routing system from the local configuration policy (step 406), if any exist, and re-runs the verification routines on the resulting local configuration policy (step 408). If the new local configuration policy passes the verification process, any reference to peers and system parameters for the removed routing system are removed from routing control device database 24. The user may request the system rule set for the deleted routing system to continue to be stored in routing control database 24 for future use after being marked as inactive by routing control device 20 (see steps 414 and 418). If left in routing control device database 24, the system rule set will not affect any routing control device 20 decisions as long as it is marked inactive. If the system rule set is not marked inactive, routing control device 20 removes it from the routing control device database 24 (step 416). The user may request that routing control device 20 remove all corresponding configurations from the routing system (see step 410). If so, routing control device 20 will generate the necessary configurations from the existing system rule sets before they are deleted from routing control device database 24 (step 412). Routing control device 20 will then use the default access method to remove the routing configurations from the routing system before continuing.

1.1.5 Adding a New Peer to the Routing Control Device

When a routing system has been added, routing control device 20 configures the peering relationships associated with the routing system in order to apply the primary routing policy configuration.

Figure 6A:
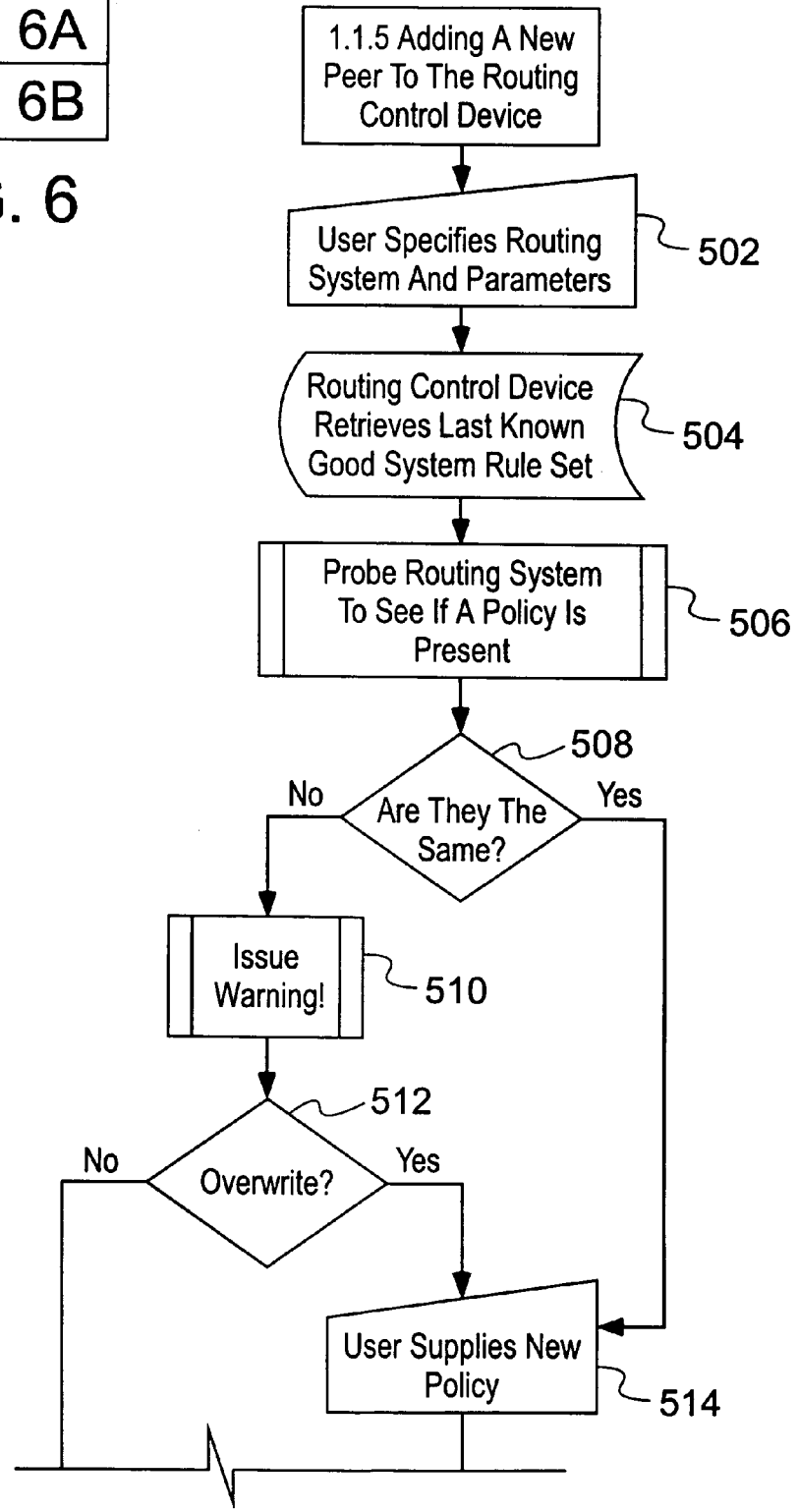
FIG. 6 is a flow chart diagram illustrating a method for adding a new peer to a routing control device.
Figure 6B:
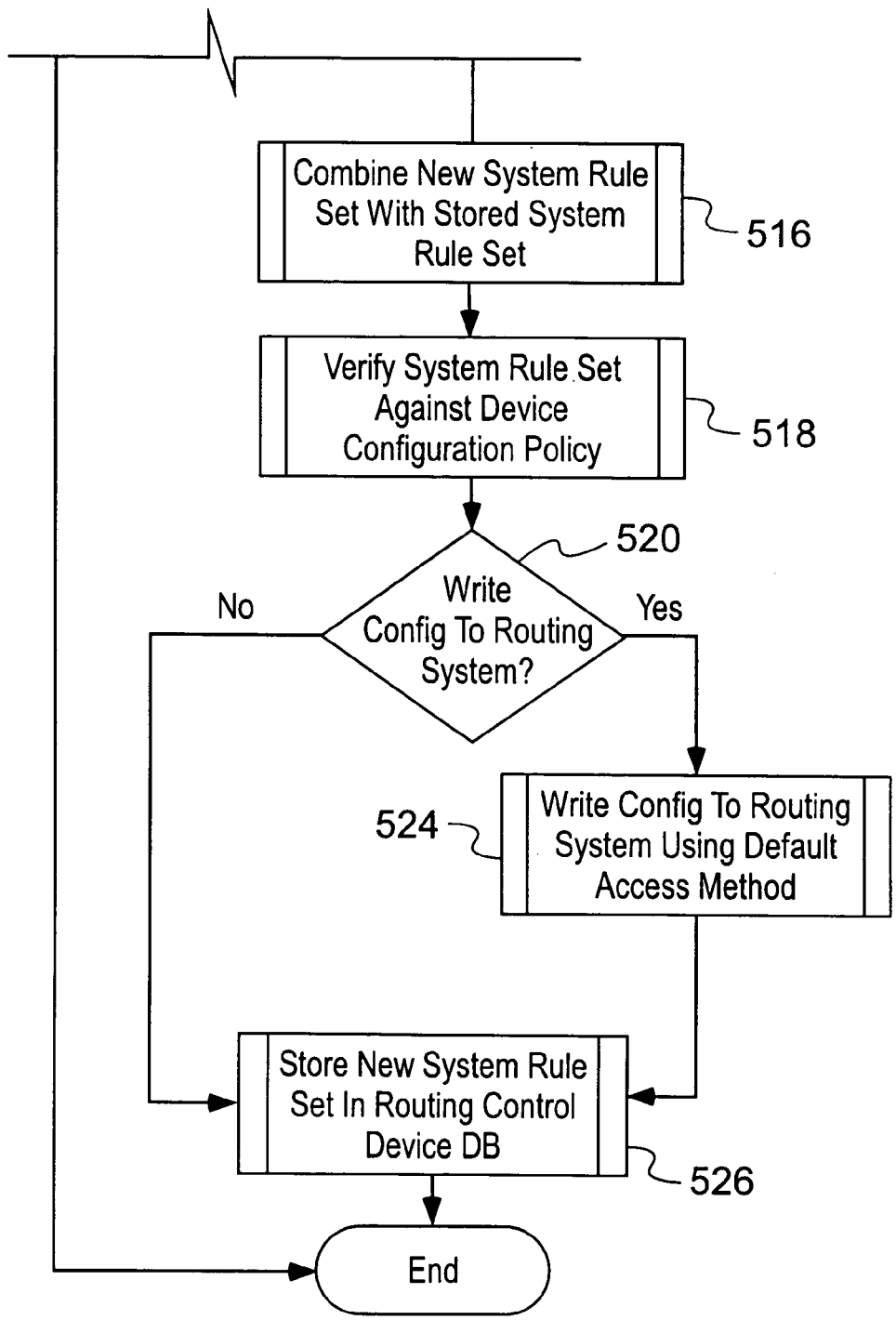

The user must supply a nominal amount of information to have routing control device 20 configure a new peer (e.g., an inter-domain peer or internal peer) or modify an existing one. Minimally, the user provides routing control device 20 with the name of the routing system 30 being configured and the IP address of the peer (e.g., inter-domain peer 60 or 62 or internal peer 34) (FIG. 6, step 502). Optionally, the user can supply routing control device 20 with additional policy requirements for this peer such as peer-specific filtering or transit parameters. Each time a new peering configuration-that is, the portion of the system rule set specific to the peer-is generated, the peering configuration state on the routing system 30 is compared with the last known good peering configuration saved in the routing control device database 24, if one exists, to ensure consistency and to detect any non-routing-control-device-20-introduced changes.

This is accomplished by retrieving the current peering configuration from the routing system 30 (step 506), translating it into a system rule set, and comparing it to the version stored in routing control device database 24 (see steps 504 and 508). If the system rule sets do not match (step 508), a warning is issued (step 510) and by default the action is aborted. However, the user may specify that if the retrieved system rule set does not match the stored system rule set, routing control device 20 should overwrite the existing configuration using the new stored system rule set (step 512). Once the system rule sets have been compared, the user supplies data explaining the desired policy outcome by responding to questions from a predefined template (step 514). This data is combined with the previously stored system rule set to generate an inclusive view of the desired routing policy for that peer (step 516). This inclusive system rule set is interpreted against the primary configuration policy and formatted to generate the new peer configuration. The completed rule set is verified for consistency with network wide policy and translated to the proper configuration nomenclature for the routing system (step 518). Unless otherwise instructed by the user (see step 520), routing control device 20 will use the previously stored default access method for the routing system to apply the new configuration (step 522). The user has the option, however, of overriding this step and choosing to apply the configuration generated by the routing control device 20 manually to the routing system. Finally, the old system rule set is replaced with the new one in routing control device database 24 (step 524).

1.1.6 Importing Existing Peers to the Routing Control Device

Figure 7:
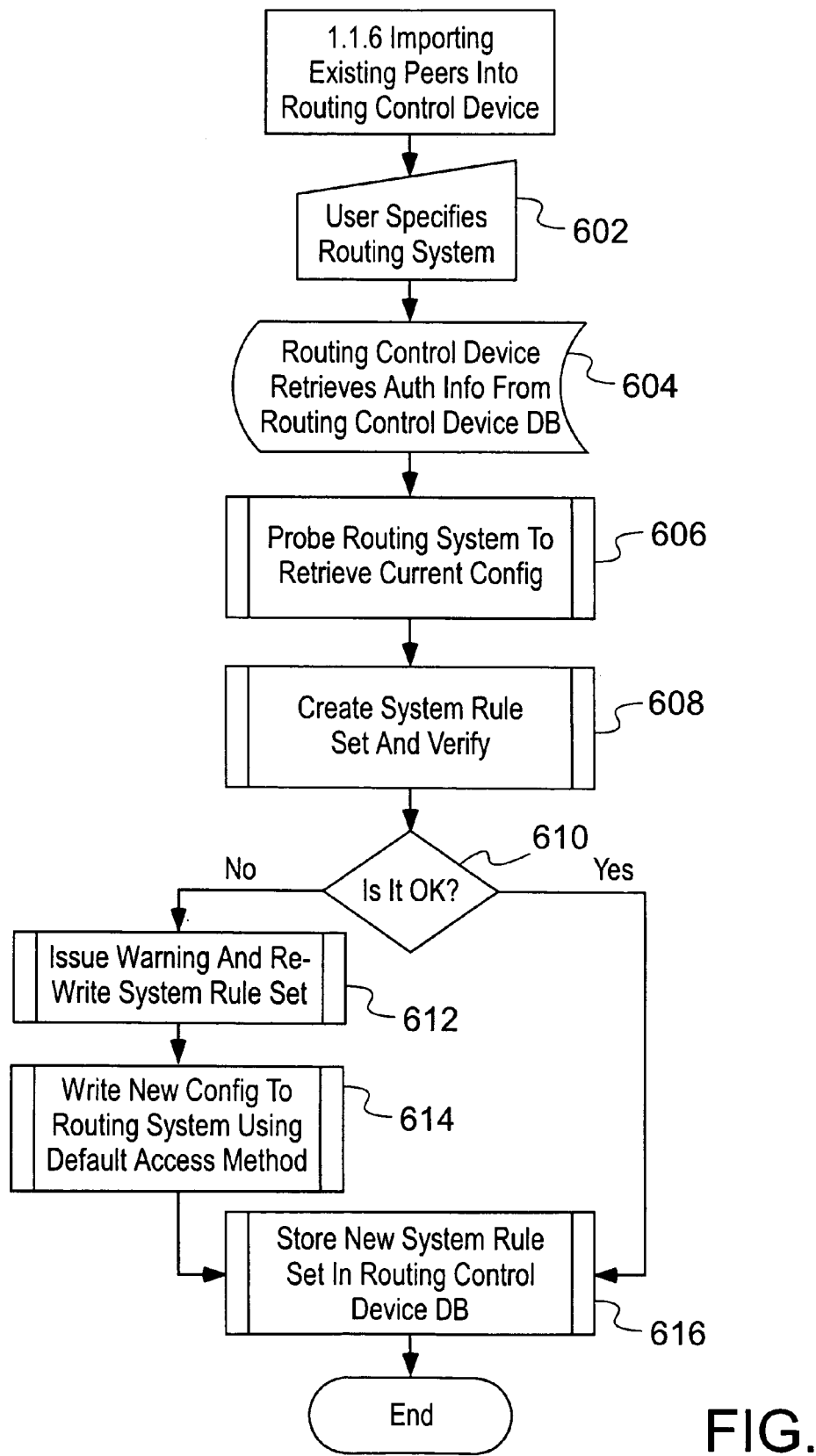
FIG. 7 is a flow chart diagram setting forth a method for importing existing peers to a routing control device.

There may be instances where a peer is manually added to a routing system. The user may add these existing peers to the routing control device by supplying the IP address or fully qualified domain name of the routing system where the peer exists (FIG. 7, step 602). Routing control device 20 retrieves access authorization information from routing control device database 24 (step 604), queries the routing system using the default access method to retrieve the current peering configuration from the routing system (step 606) and translates it into a system rule set. Next, the peer's retrieved rule set is analyzed for compliance with the primary configuration policy (steps 608 and 610). If non-compliant entries exist in the system rule set, they are re-written (if possible) so that the original intent of the desired routing policy is not lost but the resulting system rule set now complies with the primary configuration policy (steps 612). If the system rule set has been changed, the resulting configuration is written to the routing system (step 614). Finally, routing control device 20 stores the system rule set in routing control device database 24 (step 616).

1.1.7 Removing a Peer from the Routing Control Device

The user will be able to remove a peer from routing control device 20 by supplying information that uniquely identifies the peer, such as IP address of the peer, autonomous system, peering interface or other unique parameters.

Routing control device 20 will retrieve the existing system rule set for the peer from routing control device database 24 and use it to generate the configuration necessary to remove the peer from the routing system. Routing control device 20 uses the default access method for the routing system to apply the configuration and remove the peer. Finally, any data for the peer is removed from the system rule set and the resulting system rule set is stored in the routing control device database 24. Optionally, the peer configuration can be retained in the system rule set in routing control device database 24 for future use by being marked as inactive.

1.1.8 Device Deployment

Routing control device 20 may be deployed in a number of different manners for different purposes. Routing control device 20 may be deployed as a single standalone unit for operation in connection with one or more locations. Multiple devices may be deployed at a single location or at multiple locations to serve in a redundant fashion. If more than one device is talking to a routing system, the routing control device with the lowest IP address injects the best route into the routing system in accordance with BGP protocol. The priority of additional routing control devices is determined by the increasing magnitude of IP addresses.

To provide centralized management, multiple devices may also be deployed at multiple locations in a client-server relationship. In this type of relationship, routing control device 20 acting as the server identifies and locates the client devices and provides the clients with a set of policies as established on the server device for those locations.

1.2 Traffic Engineering Functions

1.2.1 Device Peering Setup and Removal

Routing systems 30 requiring traffic engineering functionality must be peered with routing control device 20 using an Internal Border Gateway Protocol (IBGP) session called a control peering session. The control peering session is the BGP4 peer relationship between the routing system 30 and the routing control device 20 used to update the routing system 30 with traffic-engineered routes. In a preferred configuration, routing control device 20 is peered to all routing systems 30 serving as egress points from the customer network or autonomous system 80. Multiple devices located at multiple egress points from the customer network may work together and share a common routing control device database 24 (not shown). A single IP address assigned to routing control device 20 is to be used as the neighbor address for all control peering sessions. Routing system 30 should supply a unique and static IP address as the preferred BGP neighbor address for establishing the control peering session between it and the routing control device 20. After initial configuration, the user can configure a standard inter-domain or IBGP peering session for the purposes of traffic engineering by supplying routing control device 20 with information that is a unique identifier for the peer on the routing system 30. Routing control device 20 will generate a system rule set based on the primary configuration policy and apply it to the routing system 30 using the default access method. To remove a traffic engineering configuration from a standard peering session, the user specifies the inter-domain or IBGP peer on the routing system by supplying a unique identifier. Routing control device 20 will retrieve the current system rule set, generate a routing system configuration to remove the inter-domain or IBGP peer, and apply the configuration to the routing system 30 based on the default access method.

1.2.2 Using BGP to Modify Routing Policy

Figure 8:
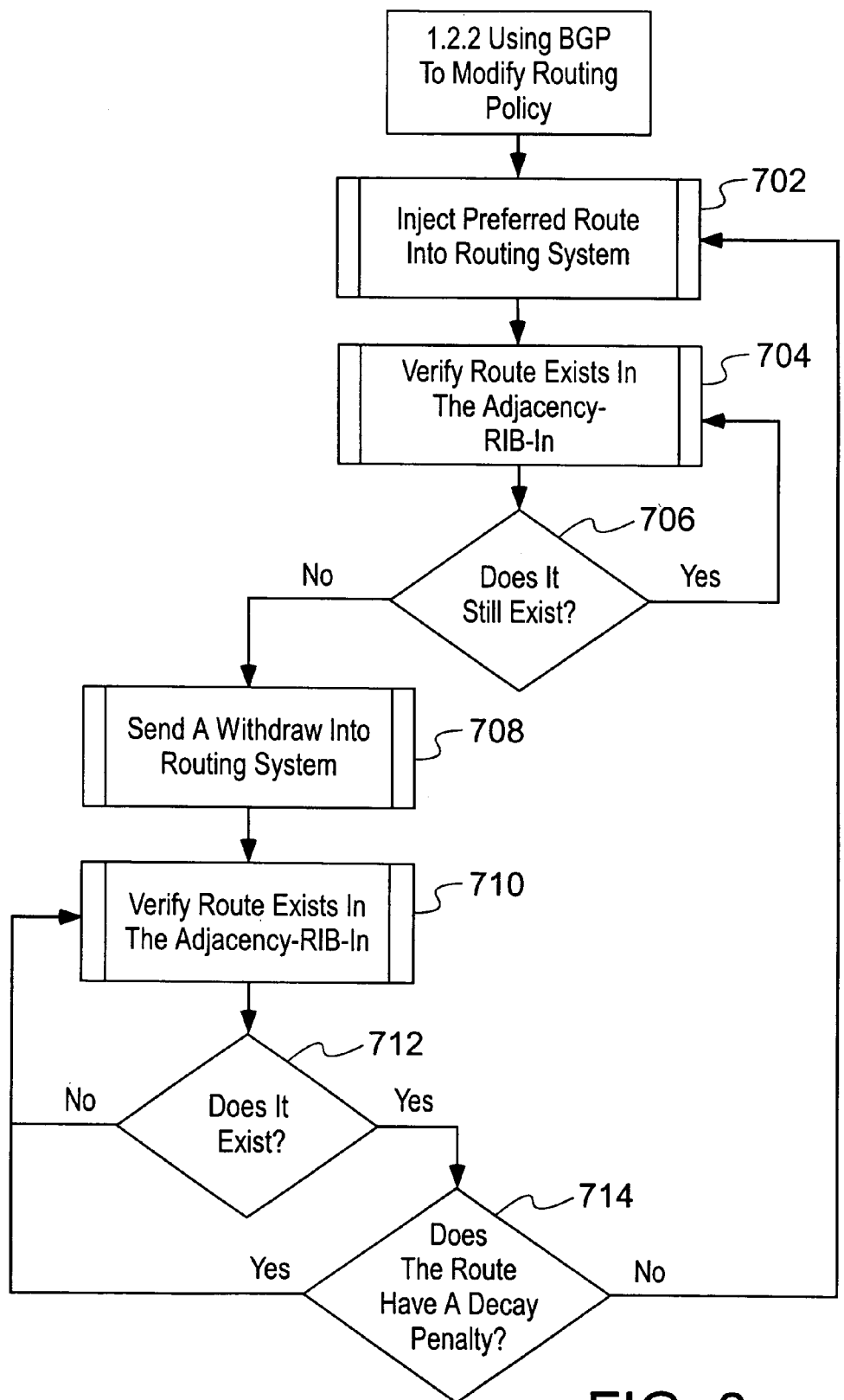
FIG. 8 is a flow chart diagram of a method for modifying routing policy of a routing system.

Once a control peering session has been established, routing control device 20 controls routing in a routing system 30 by injecting routes with better metrics than the ones installed locally. Metrics used include local-preference, weight, multi-exit discriminator, and/or others as defined by the BGP protocol. The routing system 30 interprets these routes and installs them into its local routing table as long as the control peering session is active. An adjacency-Routing Information Base-in (adjacency-RIB-in) is the total set of routes the routing system 30 receives from all BGP speakers, including routing control device 20 and all other BGP peers. Once a traffic-engineering route has been injected (FIG. 8, step 702), routing control device 20 must monitor the adjacency-RIB-in on the routing system 30 to insure the destination peer specified by the traffic engineered route maintains network layer reachability (steps 704 and 706). This may be done by polling the routing system using the default access method or by monitoring the unadulterated BGP update messages from each destination peer. If the routing system's 30 destination peer withdraws network layer reachability from routing system's 30 adjacency-RIB-in, routing control device 20 must immediately withdraw its corresponding traffic engineered route for this destination as well (step 708). Routing control device 20 should then inject a new traffic engineering route by selecting the next best destination peer after verifying that the destination peer still exists in the adjacency-RIB-in and waiting for a predefined hold down time (steps 710 and 712). Routes that are withdrawn from the routing control device 20 RIB start collecting a penalty that is reduced over time by using the exponential decay algorithm described in RFC2439. Once the half-life has been reached in the decay period, the previously withdrawn route can be used again (see step 714). Routing control device 20 can then reevaluate all potential destination peers, selecting the best route and inject a traffic engineered route into the routing system 30.

1.2.3 Frequency of Traffic Engineering

The user can define the frequency with which routing control device 20 controls routing updates being injected into the routing systems by supplying an interval timer for traffic engineering methods. If the user does not supply a metric for a given method, a default will be used. The default timer is based on the update period that achieves the best network stability for that traffic engineering method. Since routing control device 20 is simply a BGP peer using the standard protocol, if the peering session between routing control device 20 and the routing system 30 fails all modified routes are flushed from the routing system RIB.

1.2.4 Traffic Engineering Based on Load Sharing

Figure 9B:
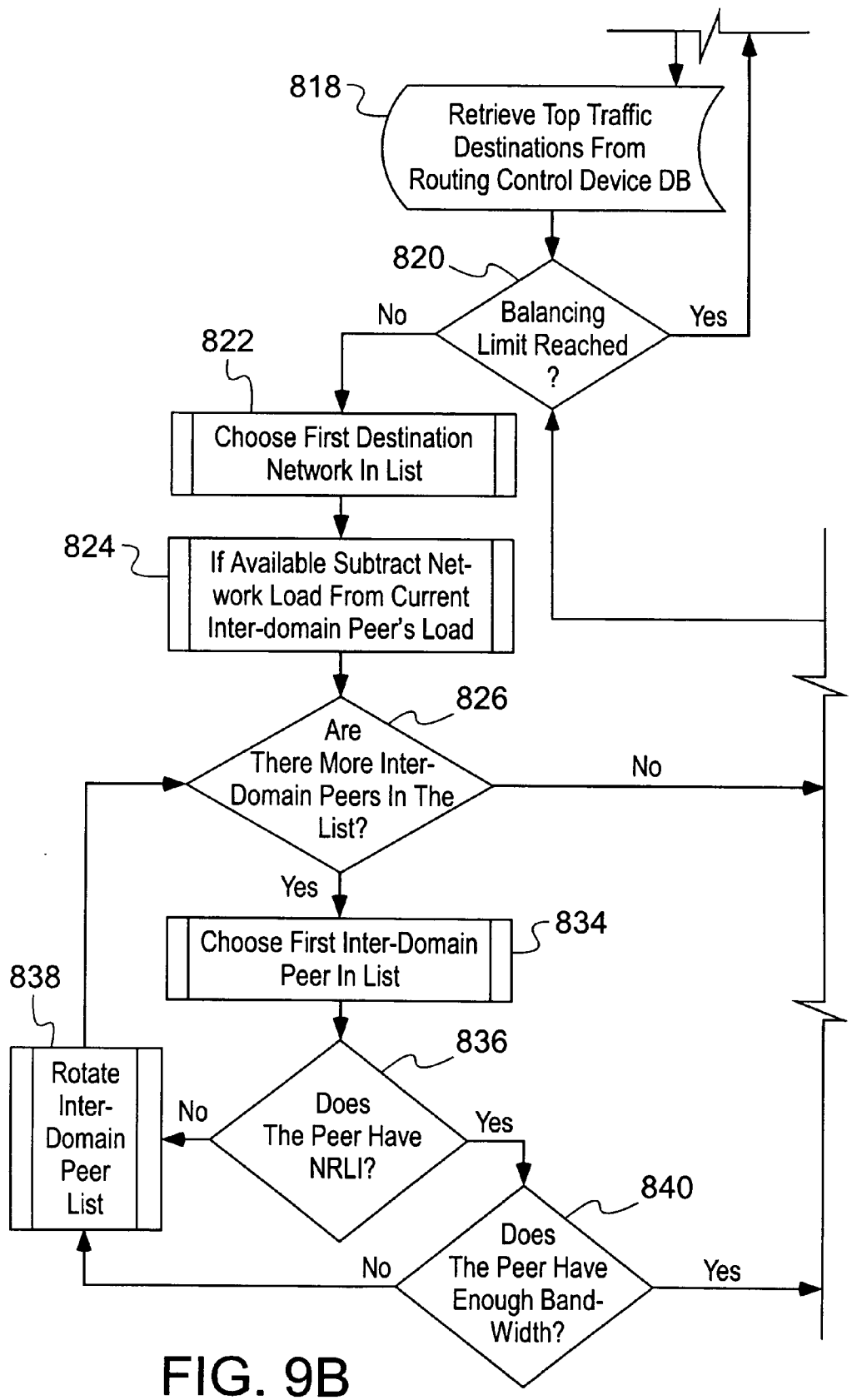
FIG. 9 is a flow chart diagram providing a method for load sharing among multiple peers.
Figure 9C:
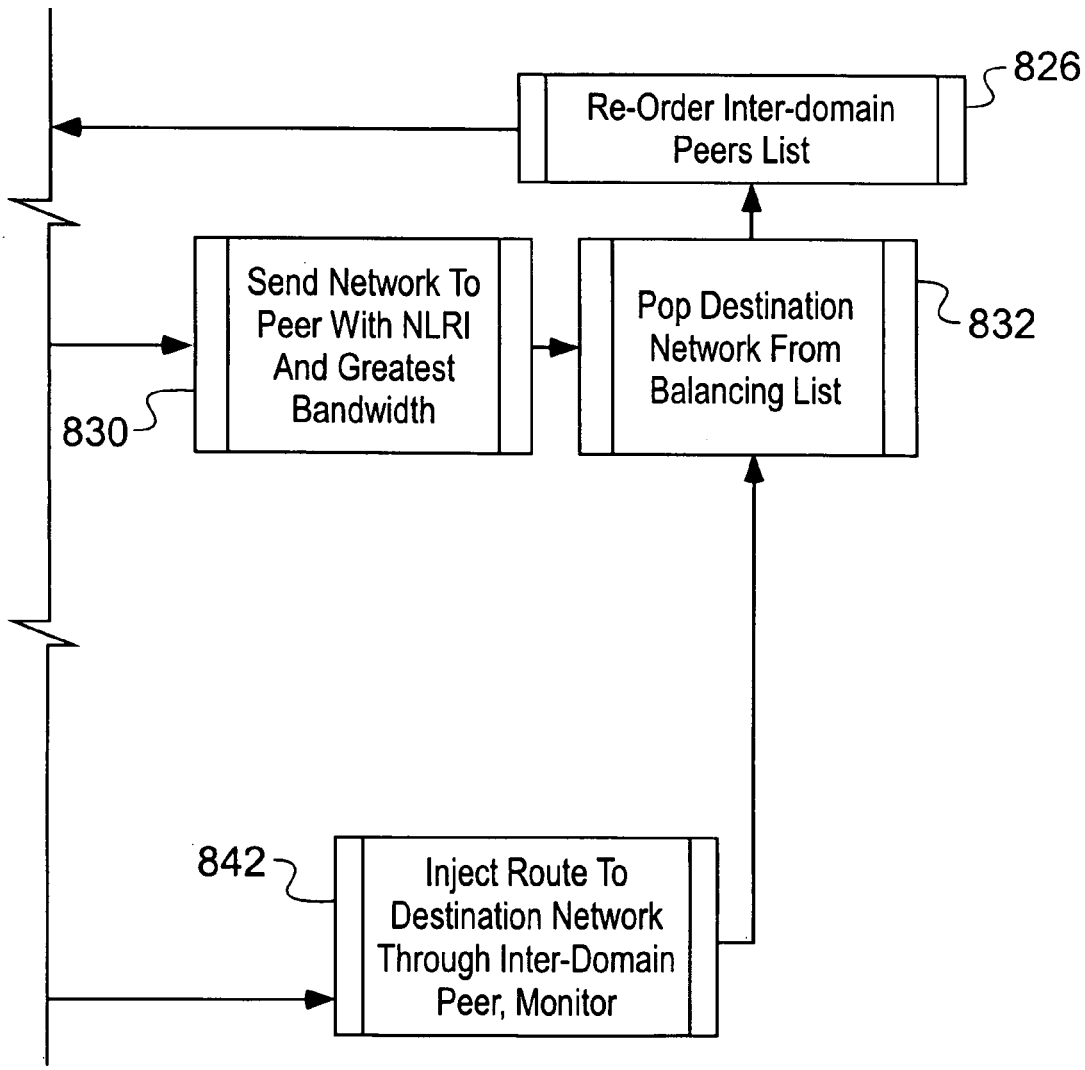

The user can request that routing control device 20 actively load share traffic across multiple inter-domain peers by supplying information that uniquely identifies each peer and a minimum utilization threshold at which the process should begin (see FIG. 9, step 814). Optionally, the user may specify a maximum threshold at which load sharing ceases (see step 816). To determine candidate network destinations for load sharing, routing control device 20 determines the active traffic load by directly sampling traffic flows from the network, by accepting sampling data from other systems, or by other deterministic or non-deterministic methods and stores the ordered results in the routing control device database 24. Traffic-sampling data is analyzed to generate the total amount of traffic per destination network (see step 804). This is accomplished by comparing each traffic flow's destination IP address to the routing system's 30 active routing table to determine the corresponding network route for the destination. A traffic flow consists of all data flowing between two endpoints that share a common session. The total amount of traffic destined for each network is then tallied and the results are sorted by quantity. This process is repeated as long as the box is expected to load share traffic. Over time, the results provide a list of the destinations with the largest traffic requirements for the routing system 30. As part of the load sharing method, routing control device 20 queries the routing system 30 using all necessary access methods (as described in 1.1.1) to monitor network utilization (see steps 808, 810 and 812). If the minimum threshold is reached (step 814) and the maximum threshold is not exceeded (step 816), routing control device 20 loads the sorted list of top traffic destinations from the routing control device database 24 (step 818). In the absence of sampling traffic or data, routing control device 20 alternates destination networks based on a heuristic designed to choose the most likely candidates for large traffic flows. Using the primary configuration policy, routing control device 20 load shares traffic based on available routing system resources. An ordered set of inter-domain peers to be balanced is generated from the IP addresses supplied by the user (step 806). In one preferred form, the first element of the set is the active peer for the largest destination network. To most appropriately load share across the available inter-domain peers, the results from a load sharing algorithm are used to select the destination peer for each network (see steps 834, 836, 838 and 840). First, the destination network's current traffic load figures are subtracted from its present destination peer's total traffic load figures (step 824). The destination network is then compared to each destination peer in the set in turn until a suitable path is found or the entire set has been traversed (see steps 828, 834, 836, 838 and 840). To find a suitable path, the first destination peer in the set is chosen (step 834) and the network is verified to be reachable through it (step 836). If so, the destination peer's current traffic load is verified to insure sufficient bandwidth is available to handle the additional burden of the destination network (step 840). If the bandwidth is available the destination peer is chosen as the best path (step 842). If neither of these expectations are met, the next destination peer in the set is analyzed against the network using the same methods (step 838). The process is repeated for the destination network until an available peer can be found or the entire set has been traversed (see step 828). If no suitable destination peer is found, then the destination peer with network reachability and the greatest available bandwidth is chosen (step 830). Once a destination peer is selected, the network is routed over that peer by injecting a BGP route update into the routing system 30 with the next hop field set to the destination peer's address, using techniques as described in section 1.2.2. The peer set is then reordered so that the chosen peer becomes the last available element in the set and the next destination peer becomes the first available element in the set (step 826). This process is repeated for each destination network in the list up to the user-defined limit (see steps 820 and 832).

While the list of networks is constantly being updated, the actual load balancing routines only run at predefined or user defined intervals. Additionally, a user may supply a local configuration policy to define how traffic is balanced between inter-domain peers. If the minimum or maximum thresholds are attained, any previously balanced networks will be maintained in the routing table, but no new networks will be injected for load sharing purposes.

1.2.4.1 Enhanced Load Sharing Process

The user can request that routing control device 20 actively load share traffic across multiple inter-domain peers using a more precise method than the basic load sharing process discussed above. As with basic load sharing, the user supplies information that uniquely identifies the routing peers to be balanced. This list of routing peers is collectively represented in an ordered list called a peer-set. Optionally, the user may specify a utilization threshold at which load sharing begins, an exceed peer address, the number of destinations to load share, destination filters, an Autonomous System(AS)-path variance, and a rebalancing interval parameter that determines how often the load balancing process runs. In addition, routing control device 20 can implement the load sharing process described below with respect to all routing systems 30 associated with the network 80 or a subset or group of routing systems 30 associated with the network 80.

To discover candidate network destinations for load sharing, routing control device 20 determines the active traffic load by directly sampling traffic flows from network 80 (see FIG. 1), by accepting sampling data from other systems, and/or by other deterministic or non-deterministic methods and stores the ordered results in routing control device database 24. Traffic-sampling data is analyzed to generate the total amount of traffic per destination network. This is accomplished by comparing each traffic flow's destination IP address to the active routing table(s) of routing system(s) 30 to determine the corresponding network for the destination address. The total amount of traffic destined for each network is then tallied and the results are sorted by quantity. This process is repeated as long as routing control device 20 is configured to load share network traffic. Over time, the results provide a list of the destination networks with the largest traffic requirements for routing system(s) 30.

Figure 14A:
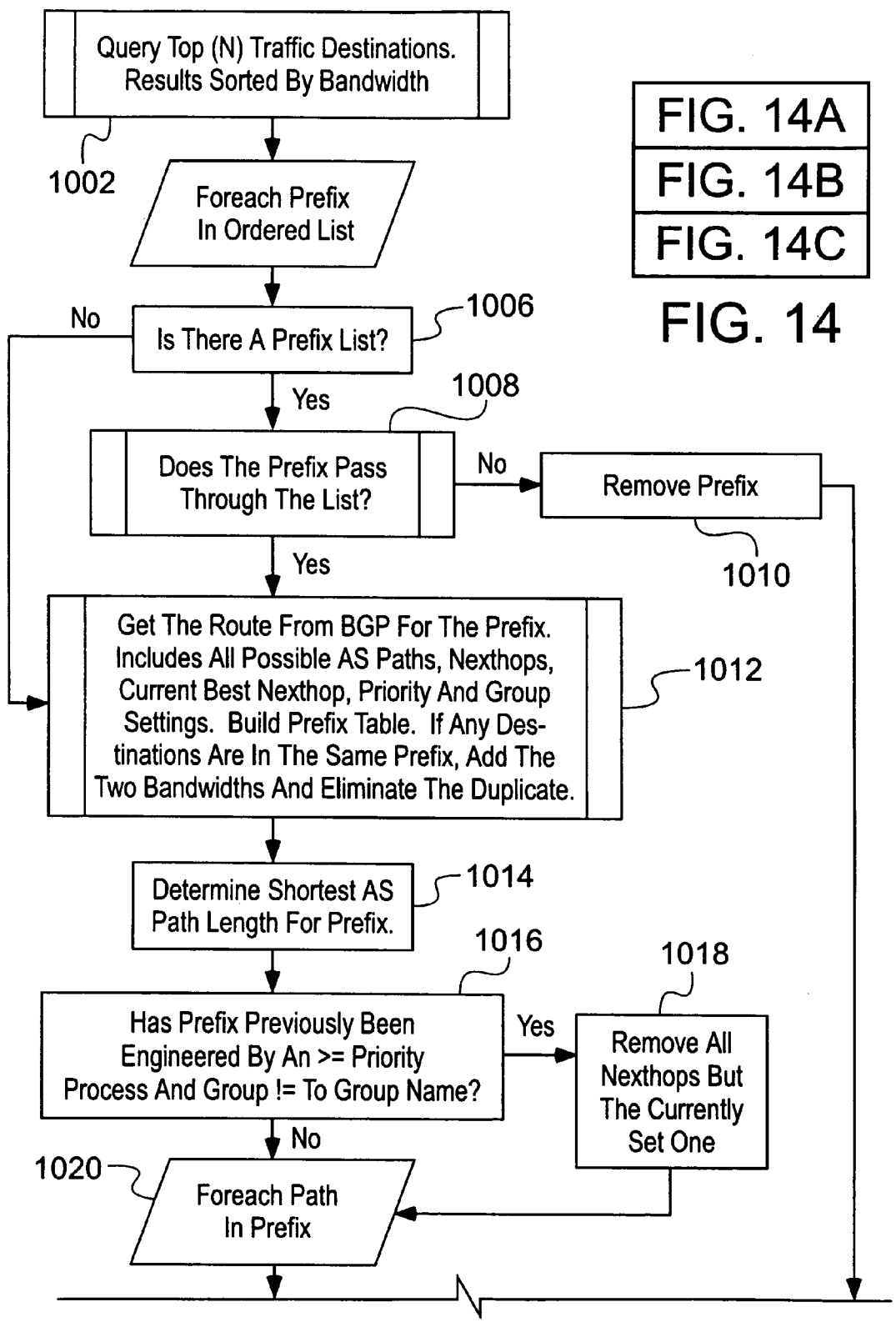
FIG. 14 is a flow chart diagram illustrating a method for distributing traffic load across a plurality of routing peers according to an embodiment of the present invention.
Figure 14B:
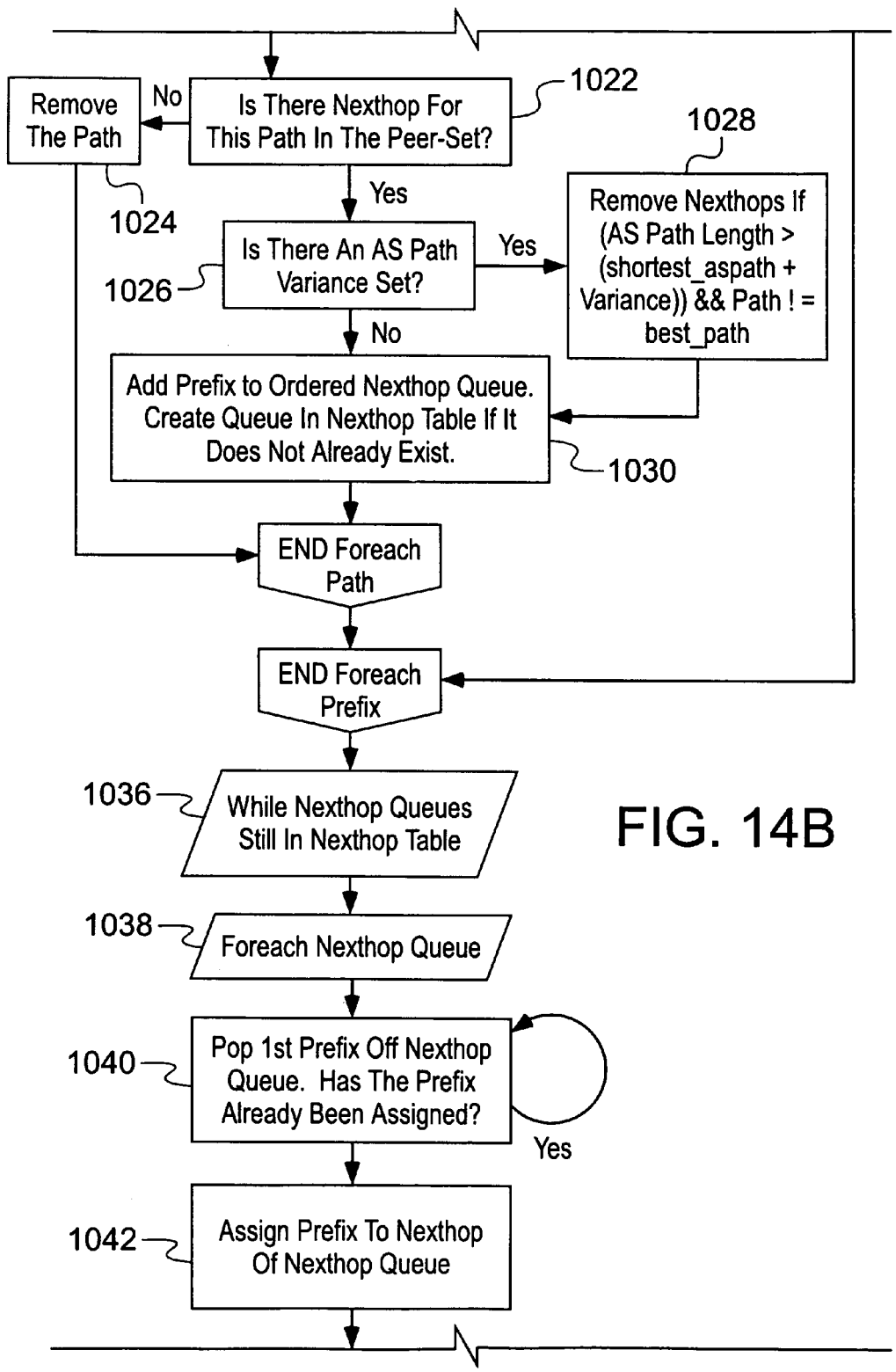
Figure 14C:
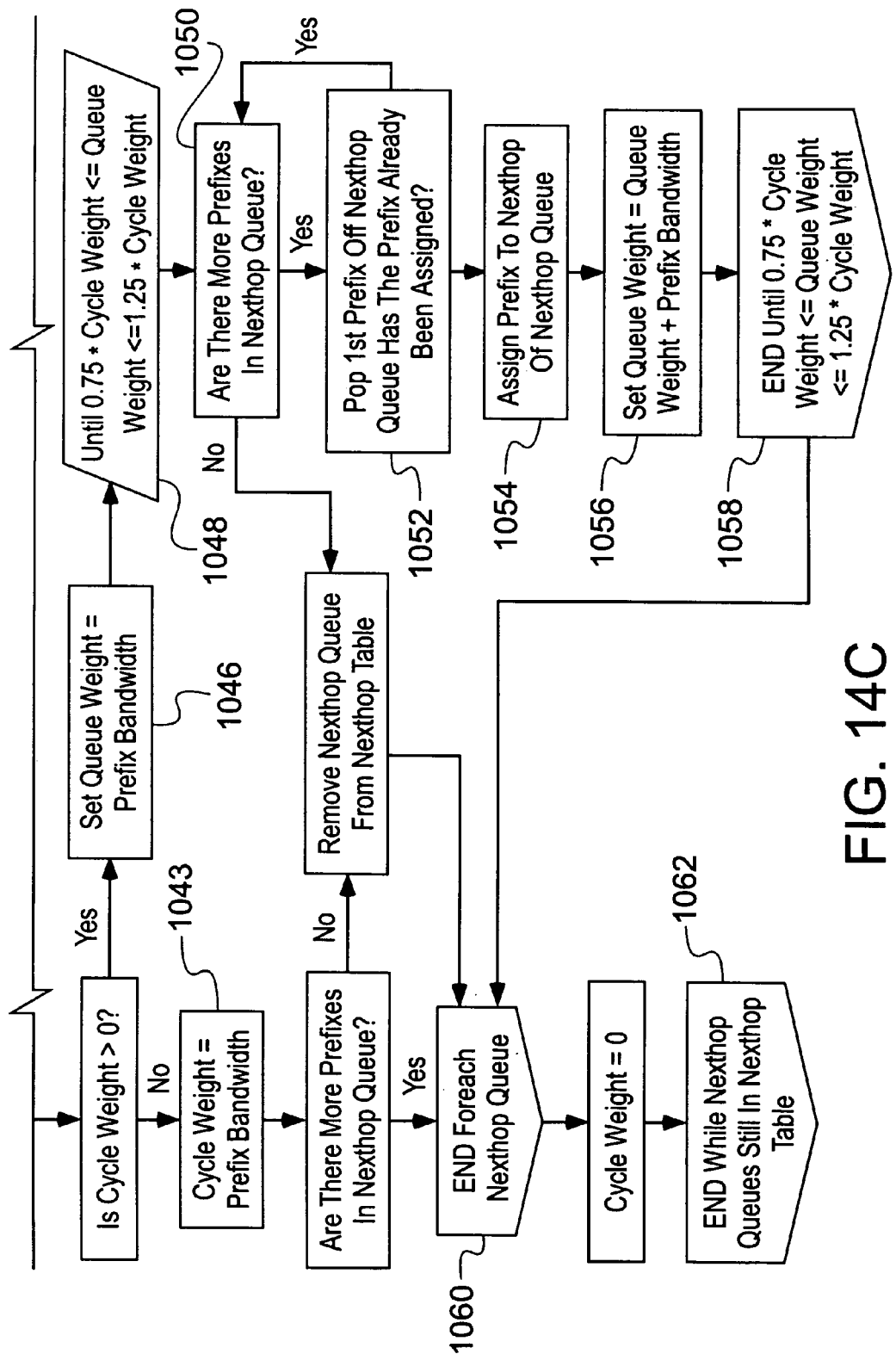
Figure 15A:
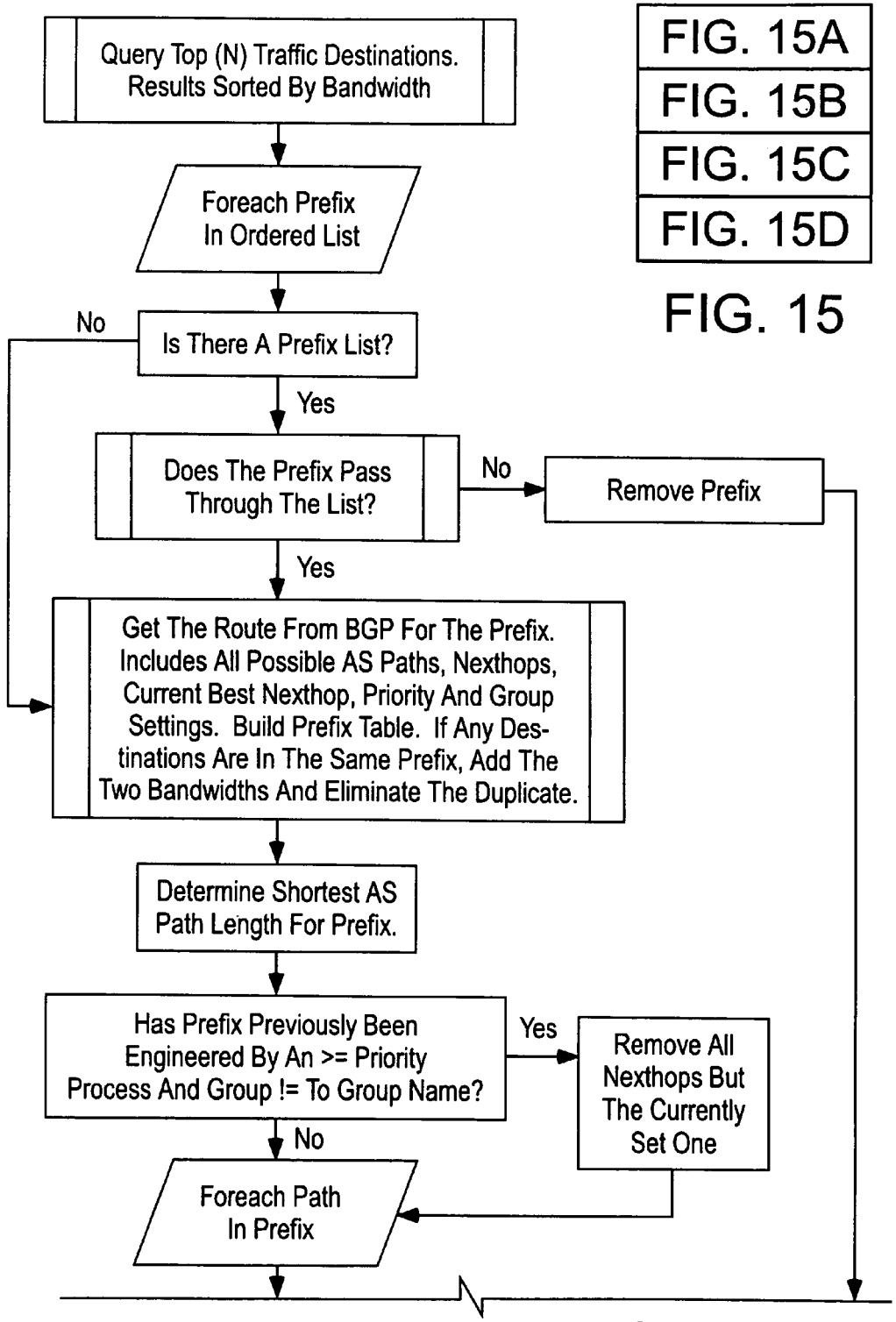
FIG. 15 is a flow chart diagram illustrating a cost-based method for distributing traffic load across a plurality of routing peers according to an embodiment of the present invention.
Figure 15B:
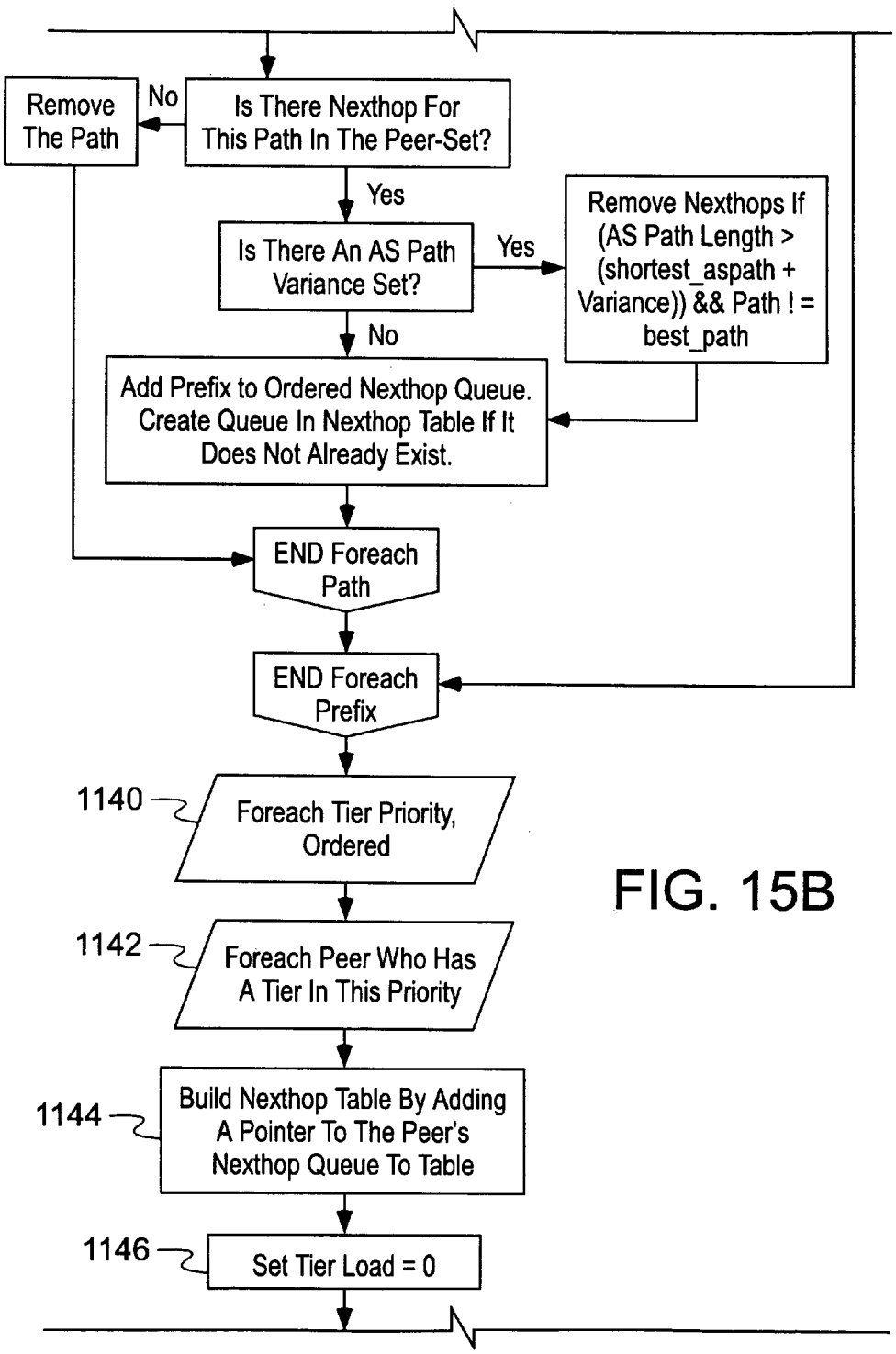
Figure 15C:
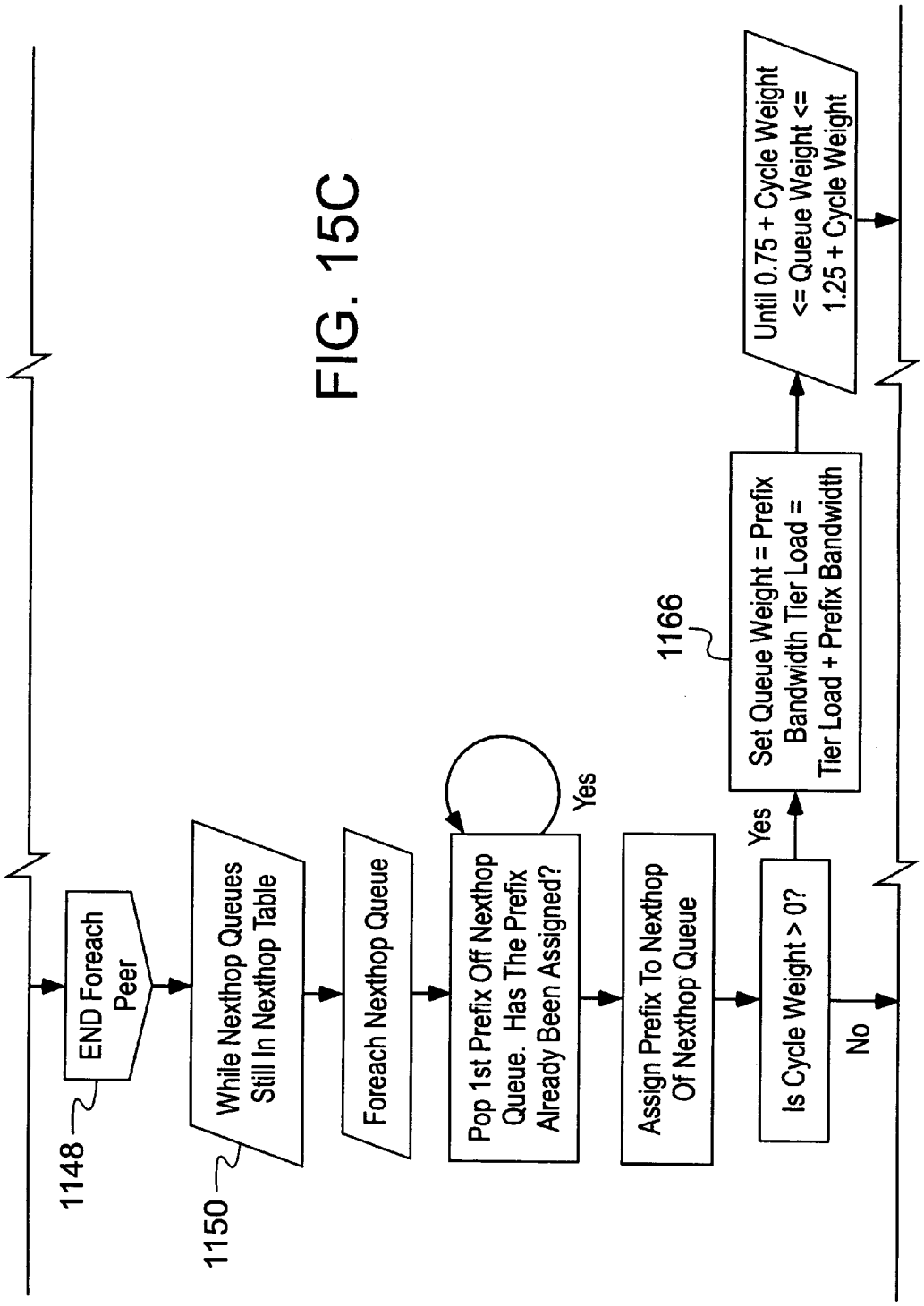
Figure 15D:
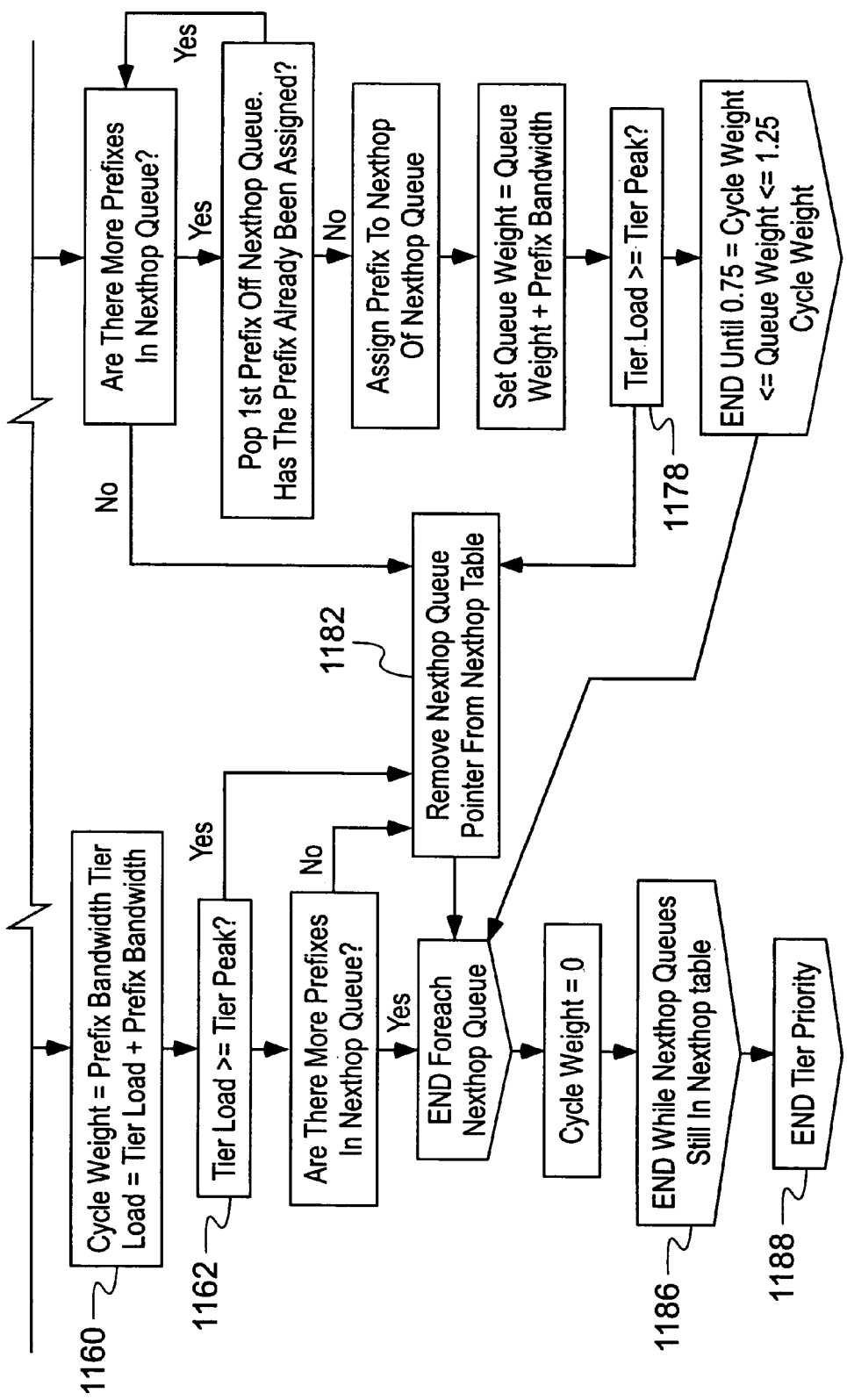

FIG. 14 provides a method allowing for the balancing of network traffic across a plurality of routing peers in a peer set. If the user has specified a utilization threshold as a percentage of the total utilization capacity of a given egress interface for a routing peer, routing control device 20 queries routing system 30 using all necessary access methods (as described in Section 1.1.1) to monitor the utilization of each peer in the peer-set, unless an exceed peer has been specified. In one embodiment, routing control device 20 maps the egress interfaces of routing system(s) 30 to each peer in the peer set to enable queries associated with utilization of routing peers. If an exceed peer has been specified routing control device 20, will only monitor the utilization of the exceed peer. If the minimum threshold is reached in either situation, routing control device 20 initiates the advanced load sharing algorithm by retrieving the top 100 destination networks from the sorted traffic list stored in routing control device database 24 (FIG. 14, step 1002). If a top parameter has been supplied, the routing control device retrieves the top N destination networks rather than the default 100. If a network prefix list filter exists (step 1006), the retrieved destination networks are filtered against that list (see steps 1008 and 1010). The resulting destination networks are queried against the routing control device BGP tables to determine the exact network prefix match, all AS paths and nexthops, group ID and priority settings for the given destination network (step 1012) (see also Table 12).

Before a traffic flow distribution is computed, routing control device 20 filters the BGP table data to reduce the data set such that it only includes valid prefixes and paths based on user defined parameters and/or the state of the routing control device (e.g., whether a previously engineered path has been inserted by a process having a higher priority than the current load balancing process). For example and in one embodiment, each network prefix in the list is analyzed to determine what the shortest AS path is for that prefix (step 1014). The shortest path's autonomous system components are then enumerated and the integer stored in the AS path variance parameter is added to the enumeration to form a maximum allowed AS path length for the given prefix. If there is an AS path variance parameter specified (step 1026), all other paths associated with the network prefix are then subjected to autonomous system enumeration as well and compared against the previously computed maximum allowed AS path length. If the path length of any single path for the given prefix is greater than the maximum allowed path length, the path is removed from the load sharing process as a possible choice (step 1028).

Routing control device 20, in one embodiment, determines the validity of each path associated with a given network prefix (see step 1020). For example, and in one embodiment, if the nexthop in a path is not in the peer set (see step 1022), it is removed (step 1024).

In one embodiment, routing control device 20 determines the priority and group associated with the network prefix. By virtue of the routing control device BGP injection method according to one embodiment of the invention, previously engineered routes have a priority and group parameter associated with them. The priority corresponds to the type of engineering and processes that injected the route, while the group equals the name of the group into which the engineered route was injected. Routing control device 20 leaves a previously engineered prefix assigned to its current nexthop or path in the event it was previously engineered by a higher priority process (see steps 1016 and 1018). In one embodiment, if the previously engineered prefix's priority is greater than or equal to the load sharing process's priority and the previously engineered prefix's group ID is not equal to the load sharing process's group ID, then routing control device 20 removes all possible paths for the prefix except the previously engineered path. As discussed below, this prevents the load balancing process from assigning any other path but the previously engineered path to the network prefix.

After the network prefix dataset has been filtered (see, e.g., Table 12), the load sharing process builds a nexthop (routing peer) table consisting of multiple nexthop queues by rearranging the network prefix dataset based on nexthop rather than network prefix (step 1030). As Table 13 illustrates, the resulting nexthop table contains a list of nexthop queues each containing the possible network prefixes to which the given nexthop has the ability to egress traffic. In one embodiment, this association is based on the network layer reachability field learned from the BGP route for each network prefix. A given network prefix may exist in more than one nexthop queue, however, since such network queues reference the same network prefix structure, an egress peer assignment in any one queue prevents a subsequent assignment of the same prefix to nexthops associated with all other queues. Since the data populating this table has been previously ordered by bytes, the resulting nexthop table retains that ordering and the network prefixes in any nexthop queue should have decreasing byte load levels.

In order to effectively distribute the network prefixes to a given set of egress peers, the load sharing process cycles through each nexthop queue in the table and removes a quantity of prefixes per queue until all prefixes in the table have been assigned to an egress peer. A cycle consists of one complete pass through the ordered set of nexthop queues (see step 1036). Depending on the size of the nexthop table, multiple cycles will probably be necessary to load share the entire set of network prefixes in the nexthop table. At the start of each cycle, the first network prefix is removed from the first nexthop queue in the dataset and is checked to see if it has already been assigned an egress peer (see steps 1038 and 1040). If it has, the prefix is discarded and the next prefix is removed and checked for previous assignment. This availability process is repeated until an unassigned prefix is found in the nexthop queue. When an assignable network prefix is located in the first nexthop queue, the egress peer for the prefix is assigned the nexthop associated with that queue (step 1042). In addition, a traffic flow weighting (cycle weight) variable is set equal to the traffic load for that prefix in bytes as previously stored by one or more traffic sampling methods (step 1043). For each subsequent nexthop queue, the process then selects one or more network prefixes whose aggregate traffic load is within a threshold range from the cycle weight variable stored above. In one embodiment, this is accomplished on a per queue basis by initially setting a queue weight variable to 0. Next, the process removes network prefixes from the current nexthop queue until one is found that has not been assigned an egress peer as previously described (step 1040 and 1042). When an assignable prefix is located, the egress peer for the prefix is assigned the nexthop associated with that queue. Additionally, the queue weight variable is set equal to the sum of itself plus the traffic load in bytes of the prefix as previously stored (step 1046). In one embodiment, if the conditional statement [(0.75 * cycle weight) <=queue weight <=(1.25*cycle weight)] is false, the prefix assignment process is repeated for the same nexthop queue until the conditional is satisfied (see steps 1048 to 1058). In another embodiment, the conditional statement only requires that the traffic flow statistic values associated with the selected destination network(s) aggregate beyond a minimum threshold level, rather than a range, derived from the traffic flow (cycle) weighting value (e.g., queue weight >=(0.75*cycle weight)). In addition, the coefficient values set forth above correspond to a preferred embodiment and represent one of myriad possible value combinations.

Once the conditional is satisfied the algorithm proceeds to the subsequent nexthop queues in the table and repeats the process for each nexthop queue in the cycle (see steps 1038 and 1060). When the cycle is completed, if there are still network prefixes in the nexthop table, another cycle is initiated. The process repeats itself until there are no more assignable network prefixes in the nexthop table (see steps 1036 and 1062). Upon completion, each prefix-path pair is inserted into the BGP routing tables as described in section 1.2.2.

1.2.4.2 Cost-Based Load Sharing Process

In one embodiment, routing control device 20 is operative to apply the load sharing process described above based on the costs associated with transmitting data to various routing peers. The user has the option of supplying additional parameters that model the cost of a given routing peer. The parameters are used by the load sharing process to assign network prefixes to the appropriate egress peers based on minimizing monthly monetary expense. In order to express a given peer's cost model the user specifies at least one pricing tier which consists of a tier number, peak level, billing type, billing rate(in dollars), and the date of the month on which the billing cycle begins, and optionally a fill priority for the given tier. A routing peer may have more than one price tier associated with its cost model. The peak level for the pricing tier may be expressed either in megabits per second or in total megabytes transferred, depending on whether the billing is based on bandwidth usage or total number of bytes transferred in a given billing cycle. The billing type can be either usage-based or flat rate. If a usage based billing type is specified, the cost is estimated at the end of the billing cycle by multiplying the tier rate times the sampled value of either megabits per second or the total megabytes sent by that tier during the billing cycle. If a flat rate billing type is specified the estimated cost for the given tier at the end of the billing cycle is simply assumed to be the rate associated with the tier. Fill priority is an arbitrary integer value that specifies in what sequence a set of tiers should be utilized. Multiple price tiers associated with different peers may have the same fill priority. If no fill priority is specified, a priority is calculated and assigned to the tier based on the cost per megabyte of the tier relative to the costs associated with all tiers in the load balancing group. The tiers are ranked by their cost and the lowest cost tier is assigned the highest priority. All remaining tiers are assigned a priority in sequence until the highest cost tier is assigned the lowest priority. Tiers that have the same cost per megabyte are assigned the same priority.

FIG. 15 illustrates a method allowing for cost-based load sharing according to an embodiment of the invention. Once the cost model is defined, a user may initiate a cost-based load sharing group in much the same way as a load sharing group discussed above. The user specifies the same required parameters and may specify the same optional parameters. The same load sharing process set forth above is used as the basis for cost-based load sharing with some modification as set forth herein. Each time a cost-based load sharing run is requested by routing control device 20 for a given group based on the group rebalancing interval, all routing peers in the group's peer set having a price tier with the same fill priority are combined to form a priority set (see steps 1142–1148). In order to assign each network prefix in the cost-based load sharing group an egress peer, the advanced load sharing process, discussed above, is individually run on each priority set in sequence by completely utilizing the resources of a given priority set until moving on to the next lower priority one.

To start the process, routing control device 20 initially chooses the highest priority set that still has a peer having a member price tier with available resources as defined by each tier's peak utilization level. A tier load variable is maintained for the life of each run of the load sharing process for every member tier in the priority set. The tier load variable, initially set to zero (see step 1146), contains the sum of all traffic in bytes for each network prefix that is assigned to the member tier's egress peer during the load sharing run (see steps 1160 and 1166). In one embodiment, the load variable is comparable with a tier's peak level by dividing the load variable by the value of the group rebalancing interval to compute megabits per second. This computation produces megabits per second since the traffic sampling methods, according to one embodiment of the invention, report the total number of megabytes seen since the last rebalancing request. Tiers whose peak levels are in total megabytes transferred per a predefined time interval (e.g., a month) must first have their peak values translated to sustained megabits per second in order to be compared against the tier load variable. If a member tier's peak level is exceeded after the assignment of any given prefix, the tier is removed from the priority set for the remainder of the load sharing run on that priority set (see steps 1162, 1178 and 1182). When all routing peers whose respective price tier peak levels have been exceeded, the priority set's resources are considered to be exhausted for the current load sharing run (see steps 1150 and 1186). If there are still unassigned network prefixes in the cost-based share group, a new load sharing run is initiated on the remainder of the prefixes using the next highest priority set. This process is repeated until all prefixes in the cost-based share group have been assigned an egress peer (see steps 1140 and 1188).

Upon completion of egress peer assignment, routing control device 20 inserts the routing updates for each prefix as necessary into the BGP routing tables of routing system(s) 30. The entire process is repeated for the cost-based share group based on the group rebalancing interval parameter associated with the share group. The group rebalancing interval is a configurable parameter and may be any suitable rebalancing interval, such as 15 minutes.

As described above, routing control device 20 distributes network prefixes among egress peers based on an estimated usage. Actual usage may be different depending on whether the top N and prefix-list parameters specified by the user for the group are inclusive of all traffic that is flowing to the respective peers. In order to be able to calculate a more accurate cost at the end of a billing cycle, each peer's egress interface on routing system 30 is queried every five minutes (or at any suitable interval) using, in one embodiment, SNMP to determine ifOutOctets (the number of bytes) in the interface's Management Information Base (MIB). For price tiers billed based on bandwidth usage, the bandwidth used during the interval is calculated as ((ifOutOctets*8)/1,000,000)/300 seconds. Each 5-minute sample is saved and at the end of the billing cycle, the 95th percentile is calculated. This value, in megabits-per-second, is multiplied by the corresponding price tier's rate to determine the total cost of the tier during the billing cycle. For tiers billed based on total usage in megabytes, ifOutOctets/1,000,000 equals the number of megabytes transferred by a given peer. The resulting value is multiplied by the rate to determine the cost of the tier after the usage for each tier is computed by the difference of the peak value set for the tier and the total megabytes transferred. The results are summed for each tier to determine the total cost for the peer during the billing cycle. At the end of a billing cycle for a given peer, all cost related parameters are reset by routing control device 20.

Figure 11:
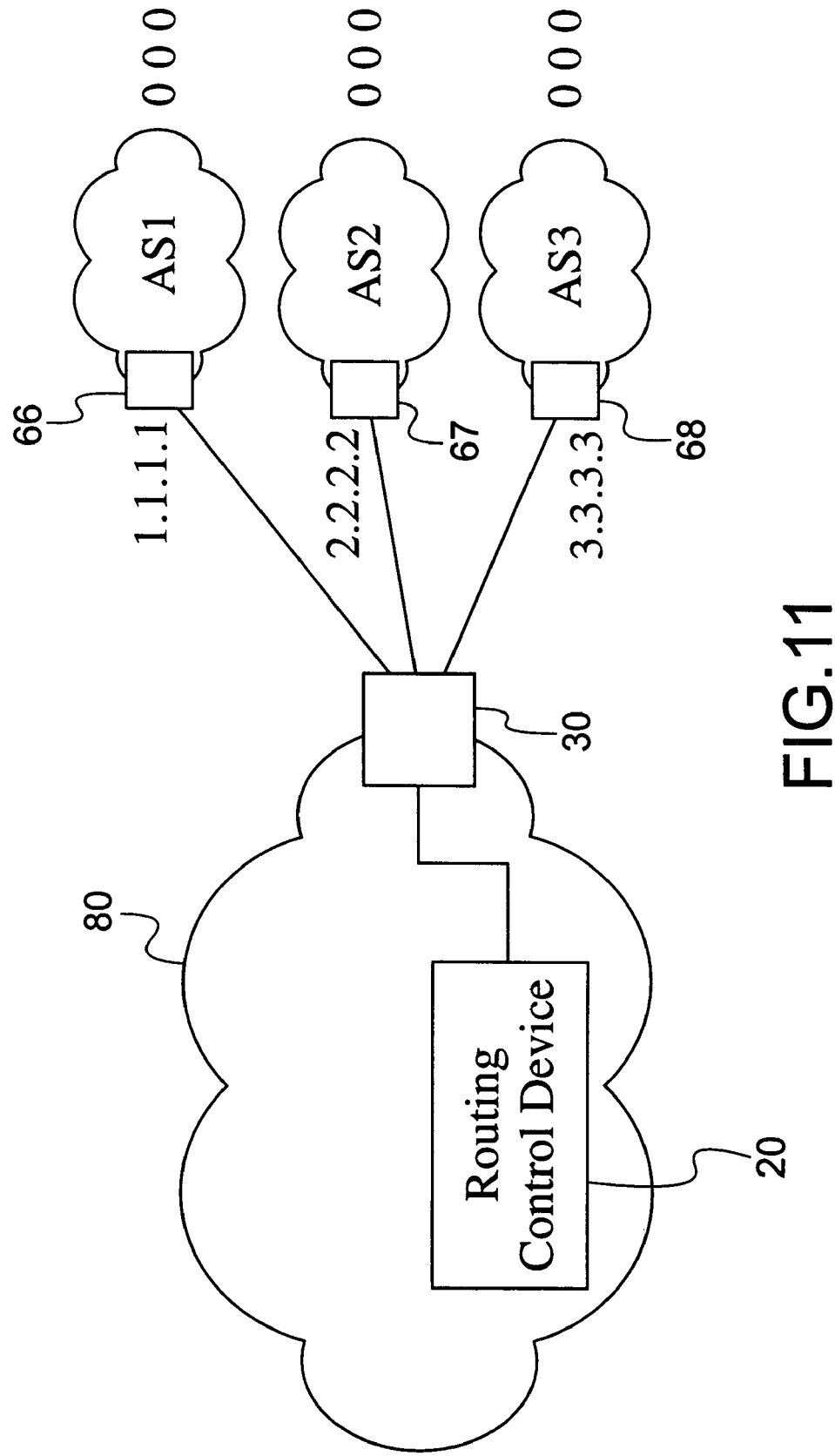
FIG. 11 is a functional block diagram providing a first computer network and routing peers associated with the first computer network.

For didactic purposes, assume that routing system 30 of FIG. 11 accesses routing peer 66 over a DS3 line having a peak utilization of 45 Mbps and flat-rate billing type of $50,000 per month. Accordingly, the cost model associated with routing peer 66 includes one price tier and a peak utilization of 45 Mbps. Assume further that routing system 30 accesses routing peer 67 over another DS3 line associated with a tiered rate plan comprising $10,000 for a monthly average rate of 10 Mbps, $20,000 for 20 Mbps, and $50,000 up to peak utilization. The resulting cost model for routing peer 67 includes three price tiers each having peak utilization levels corresponding to the rate plan set forth above. Lastly, assume that charges for accessing routing peer 68 are billed on aggregate data flows in a month according to a tiered rate structure of $10,000 per gigabyte for the first 10 gigabytes, $20,000 per gigabyte for loads up to 20 gigabytes and $50,000 for each gigabyte of data transmitted up to the peak.

To reduce costs associated with utilization of peers 66, 67, and 68, a network administrator could assign the following fill priorities to each price tier. For example, the network administrator could assign the highest fill priority to the price tier associated with peer 66, the next highest fill priority to the lowest price tiers associated with peers 67 and 68, and so on. Accordingly, routing control device 20, in a first cost-based load sharing run, assigns all possible network prefixes to routes including peer 66 as the nexthop until peak utilization of the tier is achieved. Routing control device 20 then assigns remaining network prefixes to routing peers 67 and 68 associated with the next highest fill priority, and so on, until all network prefixes have been assigned.

1.2.5 Traffic Engineering Based on Internet Performance

Figures 10, 10A, 10B:
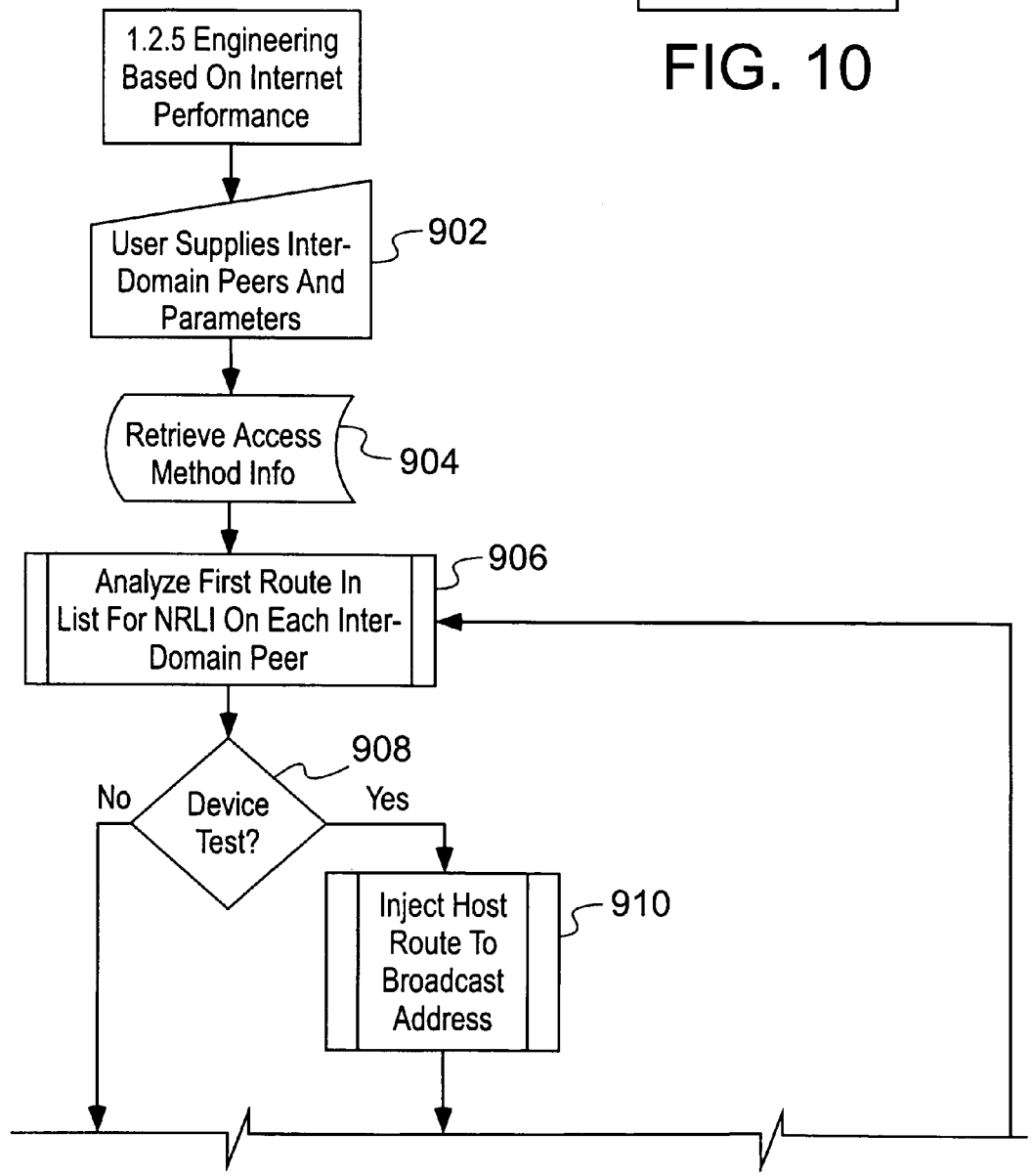
FIG. 10 is a flow chart diagram illustrating a method allowing for use of routing metrics alternative to standard BGP protocol metrics.
Figure 10B:
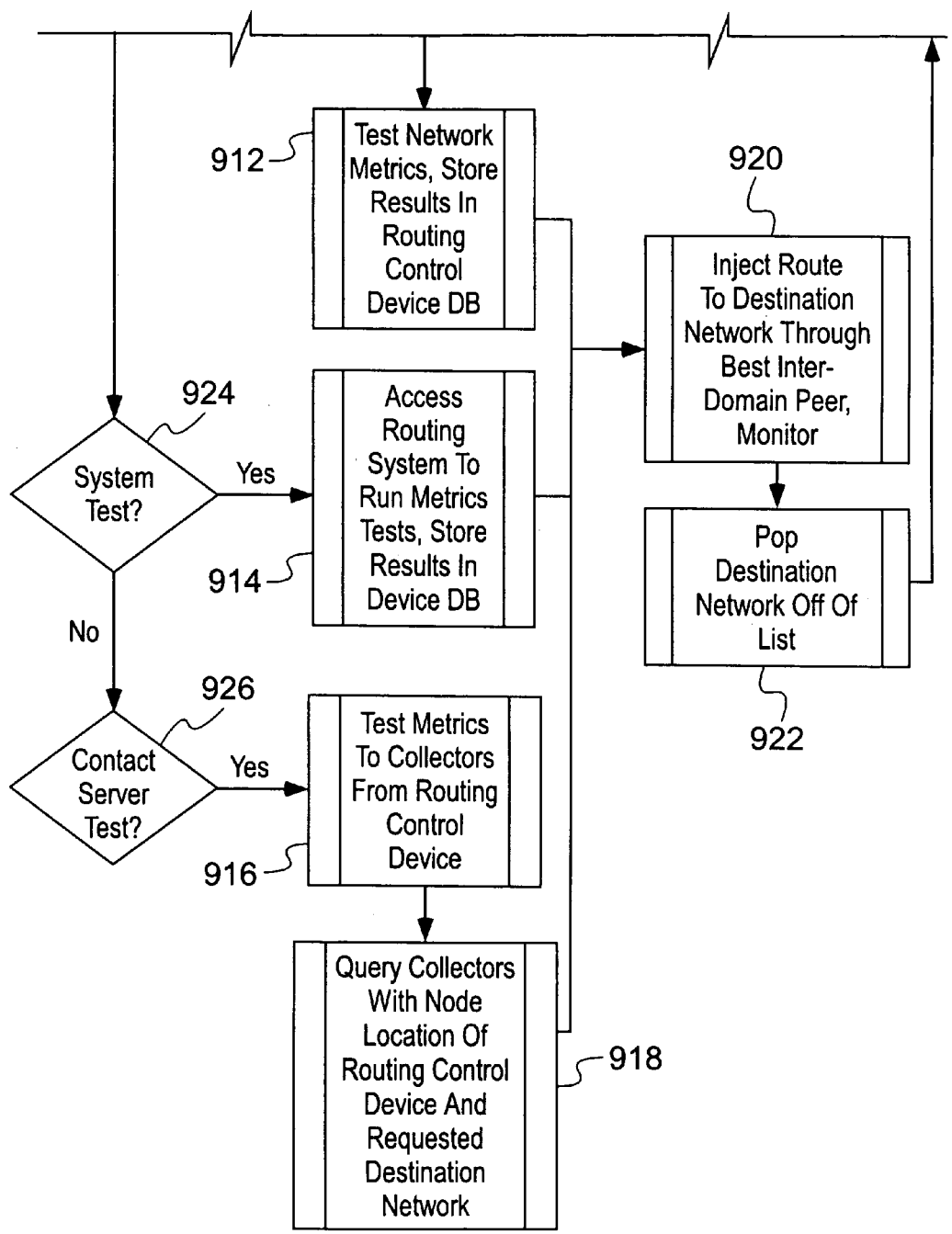

The user can request routing control device 20 to route traffic based on metrics alternative to the standard BGP protocol metrics. First, the user supplies routing control device 20 with a set of destinations to test (FIG. 10, step 902). This set may be defined as individual destinations using names, IP addresses, URLs or other host identification tags or it may be defined as a sequential list of networks. A destination set may be a local user defined list, may be supplied by an external source, or may be generated by routing control device 20 using traffic analysis similar to the method described in section 1.2.4, above. Once the destination set has been defined, routing control device 20 must determine what peers have network layer reachability to the destination networks by examining the adjacency-RIB-in on the routing system 30 (steps 904 and 906). Routing control device 20 then builds a set of possible destination peers based on this information and tests each in sequence.

Routing control device 20 has three options for determining the best path to a destination network: 1) routing control device 20 may test performance metrics itself (step 908), 2) it may request that the routing system test performance metrics (step 924), or 3) routing control device 20 may query a central location containing a set of performance metrics (step 926) [see section 2.2.1, infra]. For routing control device 20 to test network blocks internally without affecting the current traffic flows to the destination, routing control device 20 first finds the corresponding network route for a host in the destination set and identifies a list of all possible destination peers for that network route. The route entry contains enough information for routing control device 20 to determine the broadcast address for the destination network. Routing control device 20 then injects into the routing system 30 being tested a host route (i.e., a network route with an all-one's network mask) to the broadcast address of the destination network with a next hop of the first destination peer in the previously identified list of possible destination peers (step 910). Routing control device 20 runs performance tests on the path through that peer. The results are stored in routing control device database 24 for trending purposes and the process is repeated for the next destination peer (step 912). After all possible paths have been tested a best path is chosen based on the performance metrics. For routing control device 20 to test metrics from within the routing system 30, routing control device 20 queries the routing system 30 with the default access method and uses the available routing system tests such as the TCP/IP ping or traceroute facility to determine best path by sourcing the tests through each destination peer in sequence (step 914). The results are stored in routing control device database 24 for trending and a best path is chosen. Finally, routing control device 20 may query a central server by first testing the metrics from routing control device 20 to the data collectors 90 associated with a central server 40 (step 916) and then supplying the central server with the set of destination networks or hosts to be tested (step 918). The central server 40 determines the best path based on the results of tests previously run from a central location, such as to the destination networks combined with the results of the path tests between routing control device 20 and a data collector 90 associated with the central server 40. (See Section 2.2, infra, and FIG. 2.)

In all three options, best path is determined by attempting to characterize the performance of the path through each destination peer. This performance is gauged on a weighted aggregate of the results of a series of tests, which may include any of the following factors: 1) response time, 2) hop count, 3) available bandwidth, 4) jitter, 5) throughput, and 6) reliability. In addition, the path performance metric generated by the central server 40 and data collectors 90 can be used as merely another test that is weighted and aggregated with other tests in selecting the best path to a given destination. Since the function of the tests is simply to determine best path, new methods may be added in the future by simply defining the test method and adding the weight of the results to the scale. After the best path has been determined, routing control device 20 injects a route for the destination network into the routing system 30 with the next hop set to the address of the selected destination peer using techniques as described in section 1.2.2 (see steps 920 and 922).

In one embodiment, an expanded set of performance tests may be performed between two or more routing control devices at different locations. Using this expanded test method, routing policy can be engineered for data traversing between those locations. To achieve this type of engineering, routing control devices 20 perform a closed loop-test between each other. The closed-loop test runs by injecting host routes to the IP address of the remote routing control device with the next hop set to each potential destination peer in their respective routing systems. This method of testing allows routing control devices 20 to gather a greater amount of information since the flow of traffic can be controlled and analyzed on both sides of a stream. This method of testing is accomplished, in one form, using only routing control device resources.

1.2.6 Traffic Engineering Based on Time of Day

The user can initiate traffic engineering based on the time of day by specifying an action, a time, and, in some embodiments, a destination set. The action may be procedural or specific depending on the desired outcome. A procedural action is one that deals with the overall routing policy in routing control device 20. For example, a user may request that routing control device 20 cease traffic engineering for all destinations between 1 AM and 2 AM. A specific action is one that deals with a predefined set of destinations that are supplied by the user. For example, the user may request that a set of destinations use peer A during business hours and peer B at all other times. Routing control device 20 identifies and attempts to resolve inconsistencies between multiple time-of-day policies. Once valid time-of-day engineering is determined, routes that conform to the policy are injected using techniques as described in section 1.2.2.

1.2.7 Explicit Traffic Engineering

Explicit traffic engineering allows the user to explicitly set a policy regardless of peer load or path metrics. For example, the user can specify that all traffic to a destination network always exit through a given peer. After verifying that the route has valid network layer reachability through the destination peer, routing control device 20 will inject a route for the network with the next hop set to the destination peer. If the peer does not have reachability to the network, routing control device 20 will not inject the route unless the user specifies that the policy is absolute and should not be judged based on network layer reachability. Explicit traffic engineering routes are injected into the routing system(s) 30 using techniques as described in section 1.2.2.

1.2.8 Ingress Traffic Engineering

Part of the primary configuration policy defines how local network announcements are made to other autonomous systems. These announcements influence the path ingress traffic chooses to the set of local networks and routing systems for the user's autonomous system. If a user wishes to modify network advertisements in order to influence inbound path selection, the local configuration policy is defined so as to modify outbound route advertisements to inter-domain peers. Modifications to the outbound route advertisements include BGP techniques such as Multi-Exit Discriminators (MEDs), modification of the AS Path length, and network prefix length adjustment selected from a template of available modification types. This local configuration policy is uploaded as part of the primary routing configuration policy as described in section 1.1.3.

1.2.9 Soft Network Layer Reachability Information

In one embodiment, routing control device 20 allows for more granularity in load sharing and other traffic engineering processes than otherwise available using standard Network Layer Reachability Information (NLRI). BGP updates for a given network prefix must contain a valid network layer reachability information (NLRI) field. Routing control device 20 uses the information in the NLRI field to determine to where traffic flows destined for a given network prefix are capable of being routed. In one embodiment, routing control device 20 operates on the assumption that, if a parent network is reachable via a given nexthop, all subnets of that parent should be reachable via the same nexthop. Routing control device 20 uses this concept called soft NLRI (SNLRI) to enhance various traffic engineering processes discussed herein.

When traffic engineering, routing control device 20, by default, inserts routing updates to match the originally advertised prefix of the network, as it exists in the local BGP table. However, the larger the prefix the less accurate any performance measurement or load sharing decision will be due to the increased number of hosts in the prefix. In order to be more accurate in performance based (see Section 1.2.5) or load sharing routing updates, a network administrator may configure routing control device 20 to engineer routes based on a specified network mask size, as opposed to the network masks associated with standard NLRI address information. In one embodiment, routing control device 20 may effectively increase the network mask size of a given prefix by injecting routes associated with a single or multiple soft NLRI (SNLRI) subnets of the network prefix being engineered.

In a preferred embodiment, routing control device 20 applies certain rules when engineering SNLRI routes. Each SNLRI subnet of a given network prefix may have different nexthop information as long as there exists a corresponding parent route with the same nexthop in the BGP table of routing control device 20. Furthermore, a SNLRI route may not be injected if a more specific naturally occurring NLRI subnet route with the same prefix and mask length as the engineered SNLRI route already exists in the routing table. For example, routing control device 20, engineering SNLRI routes for a network prefix of 192.168.0.0/16 down to a /17 network mask (breaking the prefix into SNLRI prefixes of 192.168.0.0/17 and 192.168.128.0/17), first determines whether a naturally occurring NLRI route for either prefix exists in the BGP routing table. If a natural route exists for 192.168.128.0/17, for example, routing control device may inject a route for the 192.168.0.0/17 network prefix, but not both prefixes. Unless prohibited by the previous caveats, routing control device 20 injects SNLRI routes to cover the entire range of the parent network prefix. For example, routing control device 20, engineering a standard prefix of 192.168.0.0/23 to a /24 network mask, injects routes for 192.1 68.0.0/24 and 192.168.1.0/24, unless one of these routes already exists as a naturally occurring route. Additionally, if routing control device 20 injects a SNLRI subnet route using the process outlined in 1.2.2, routing control device 20 monitors the parent route with the same NLRI information as the engineered SNLRI subnet route and removes the engineered SNLRI route(s) should the parent route be withdrawn. Still further, although the foregoing examples effectively increase the network mask by one bit, routing control device 20 can engineer SNLRI routes for more specific subnets. For example, routing control device 20 can engineer SNLRI routes for a network prefix having a /16 network mask down to, for example, /24 network prefixes.

As discussed above, soft NLRI can be used in the load balancing processes described above. In one embodiment, routing control device 20 allows a network administrator to configure load balancing of network prefixes down to a given subnet mask (e.g., /24), if possible. In one embodiment, routing control device 20 for a /16 network prefix, for example, determines the traffic load to all /24 subnets of the parent network prefix and performs the load sharing process with respect to each /24 subnet. SNLRI may also be used in connection with other network traffic engineering processes, such as performance-based traffic engineering (see Section 1.2.5) and explicit traffic engineering (see Section 1.2.7).

1.2.10 Precedence of Traffic Engineering Rules

When multiple traffic engineering methods are configured, there is potential for conflict between those methods. In one embodiment, the priorities for traffic engineering methods for routing control device 20 is: (1) Time of day traffic engineering has highest precedence; (2) Explicit traffic engineering has second precedence; (3) Performance traffic engineering to a limited set of destinations identified by the user has third precedence; and (4) Load sharing traffic engineering has fourth precedence. For third precedence, if the results of a general load-balancing test would negate the results of a metrics based update for a specific route, then the load balancing update for that route will not be sent.

Other embodiments may include precedence methods that contain user-defined priorities, precedence methods based on IGP routing protocols such as OSPF or IS-IS, or precedence methods based on value-added functionality additions.

1.2.1 1 Additional Methods for Traffic Engineering

The design of the routing control device 20 is extensible such that additional methods for traffic engineering may be added by defining the method as a module for inclusion into the routing control device 20. Methods for traffic engineering may include: Interior Gateway Protocol Analysis, enforcement of Common Open Policy Service (COPS), enforcement of Quality of Service (QoS), arbitration of Multi-protocol Label Switching (MPLS), and routing policy based on network layer security.

1.3 Monitoring and Management Functions 1.3.1 CLI Monitoring and Management

Routing control device 20 includes a command line interface that allows the user to monitor and configure all parameters. The command line interface accepts input in the form of a text based configuration language. The configuration script is made up of sections including general device parameters and peering setup, policy configuration, load balancing configuration, and traffic engineering configuration. Routing control device 20 also provides multiple methods for access and retrieval for the configuration script. The command line interface also allows the user to manually query routing control device 20 parameters such as routing tables and system load.

1.3.2 Web-based Monitoring and Management

The user may enable a locally run web server on routing control device 20 that allows complete control and reporting functions for routing control device 20. Configuration consists of four main areas. The user may configure routing policies, load balancing functions, traffic engineering functions, and general device parameters. All configurations entered into the web interface are translated into a routing control device 20 configuration script format that is compatible with the command line interface. The web interface also reports on all aspects of routing control device 20 operations and statistics that have been collected. The user may view routing statistics such as currently modified routes, statistics on response times, and route churn. Routing control device 20 also reports on traffic statistics such as peer utilization and traffic levels by Autonomous System. Finally, routing control device 20 reports on routing system health statistics such as processor load and free memory.

1.3.3 Event Management

Routing control device 20 keeps a log of events. This log may be viewed locally on routing control device 20 or is available for export to an external system using methods such as the syslog protocol. This log tracks events such as routing updates, configuration changes to routing control device 20 or systems, and device errors.

1.3.4 Management Information Base

Routing control device parameters and system variables are capable of being queried using the Simple Network Management Protocol. A vendor-specific Management Information Base (MIB) located in the routing control device 20 supplies access to system statistics and information useful for network management applications.

2.0 Exemplary Deployment Configurations

The functionality described above can be deployed in a variety of configurations. For example, routing control device 20 can be deployed in a stand-alone configuration or as part of a centrally managed service. In addition, routing control device 20 can operate in connection with a centralized routing control database 42 storing routing path information gathered by a plurality of data collectors 90 connected to an autonomous system (see FIG. 2). Moreover, the functionality described herein can be incorporated into a centralized routing policy management service requiring no equipment at the customer's site.

2.1 Functionality in an Internet Appliance

2.1.1 Basic Functions of the Appliance

As an appliance, routing control device 20 is a standalone box that runs on a kernel based operating system. The kernel runs multiple modules, which handle the individual tasks of routing control device 20. For example, the appliance may comprise a Linux-based server programmed to execute the required functionality, including an Apache web server providing an interface allowing for configuration and monitoring. Modules are proprietary code that implements the policy and engineering functions described above. Additionally, the kernel handles system functions such as packet generation and threading. Routing control device 20 includes one or more network interfaces for peering and traffic sampling purposes. An included BGP protocol daemon is responsible for peering and for route injection. A web server daemon provides a graphical front end.

2.1.2 Managed Service

A managed service is defined as the purchase of a defined set of capabilities for a monthly recurring charge ("MRC"). The company owns all hardware, software, and services required to operate such capabilities, and costs of which are part of the MRC. Customers bear minimum up front costs and pay for only the services they use.

2.1.2.1 Customer-Premise Managed Service

Routing control device 20 resides at the customer site, but is run centrally at the Routing Control Center (ARCC@) 25. Through a graphical user interface presented by a web server at the RCC 25, the customer, using an Internet browser, directs the RCC 25 to conduct changes to the appliance 20 on their behalf. The RCC 25 connects directly to the customer premise appliance 20 in a secure manner to modify the modules as required. The customer is able to monitor the system through a Web interface presented by the RCC 25 and view reports on network statistics.

2.1.2.2 Virtual Managed Service

Routing control device 20 or the functionality it performs resides and is run centrally at the Routing Control Center 25. In this form, routing control device 20 becomes an IBGP peer with customer systems through an arbitrary network topology to control customers' routing policy at their location. Customers connect to this service through a dedicated, secure connection, using a graphical Web interface to interact with the RCC and monitor the impact of this service on their network connections.

2.1.3 Value-added Enhancements

Both appliance and managed service customers are able to enhance the functionality of their appliances. These enhancements may include further functionality additions, periodic updates of data used by the appliances as part of the policy engineering process, and subscription to centralized services.

2.1.4 Technology Licenses

In one form, the functionality performed by routing control device 20 can be packaged as a stand-alone set of software modules that third-parties may implement on their own platforms. For example, a third party may license the traffic engineering functionality described herein. For a fee, the third party will be able to integrate the technology into its product or service offering, which may include the outsourcing of all or part of the managed services solution.

2.2 Using the Appliance for a Global Routing Policy Service

In addition, the Routing Control Center 25 may be a source of Internet Routing policy data for routing control devices 20 at customer autonomous systems 80.

2.2.1 Gathering Routing Policy Information

Routing control device 20 is capable of querying a central server 40 to determine network topology and path metrics to a given destination set. This central server 40 is a device designed to build a topological map of the Internet using a plurality of data collectors 90. These data collectors 90 are placed in strategic locations inside of an autonomous system 80. In a preferred form, each data collector 90 will be located at the maximum logical distance from each other data collector. An example of a preferred collector configuration for the continental United States would include a minimum of four data collectors (see FIG. 2). One data collector 90 is placed in an east coast collocation facility. One data collector 90 is placed in a west coast collocation facility. Two data collectors 90 are placed in collocation facilities located centrally between the two coasts, (for example) one in the north and one in the south. This allows the data collectors to characterize all possible network paths and metrics within the autonomous system 80.

The data collectors 90 build sets of destination network routes to be analyzed by enumerating a list of all or a portion of routes received from a BGP session with a routing system within the subject's autonomous system 80. A partial set of routes will minimally include provider and customer-originated networks. The data collectors 90 then test the path to each network in the list by using a method similar to the TCP/IP traceroute facility as described below. This involves sending packets to the destination host with incrementing time to live (TTL) field values. The first packet is sent with a TTL of 1. When it reaches the first intermediate system in the path, the intermediate system will drop the packet due to an aged TTL and respond to the collector with an ICMP packet of type TTL exceeded. The data collector 90 will then send a second packet with the TTL set to two to determine the next intermediate system in the path. This process is repeated until a complete intermediate system hop-by-hop path is created for the destination network. This list is the set of all ingress interfaces the path passes through on each intermediate system in route to the destination network.

The data collector 90 then determines the egress interfaces for each intermediate system in the path as well. Network transit links can be generalized by classifying them as either point-to-point or point-to-multipoint. When the data collector 90 maps the intermediate system hop-by-hop path for the network destination, it is really receiving the ICMP response that was sourced from the ingress interface of each intermediate system in the path. Based on the IP address of the ingress interface of each intermediate system, the data collector 90 will use a heuristic method to determine the egress interface of the previous intermediate system. Due to the design of the TCP/IP protocol, the IP address of the ingress interface on any intermediate system in a path must be in the same logical network as the IP address of the egress interface of the previous intermediate system in the path. To find the exact address of the egress interface, the data collector 90 first assumes that the link is a point-to-point type connection. Therefore, there can be only two addresses in use on the logical network (because the first and last available addresses are reserved for the network address and the network broadcast address, respectively). The data collector 90 applies a /30 network mask to the ingress interface IP address to determine the logical IP network number. With this information the data collector can determine the other usable IP address in the logical network. The data collector 90 assumes that this address is the egress interface IP address of the previous intermediate system in the path. To verify the assumption, the data collector 90 sends a packet using the assumed IP address of the egress interface with the TTL set to the previous intermediate system's numerical position in the path. By applying this test to the assumed egress interface's IP address, the data collector 90 can verify the validity of the assumption. If the results of the test destined for the egress interface IP address of the previous intermediate system are exactly the same as the results when testing to the previous intermediate system's ingress interface IP address, then the assumed egress interface IP address is valid for that previous intermediate system. The assumption is validated since the results of each test, executed with the same TTL parameters, return the same source IP address in the response packet sent by the intermediate system being tested even though the destination addresses being tested are different since the intermediate system should only ever respond with packets being sourced from the ingress interface.

If the assumption is not validated, the intermediate system is assumed to be a point-to-multipoint type circuit. The network mask is expanded by one bit and all possible addresses are tested within that logical network, except the ingress interface address, the network address, and the broadcast address, until a match is found. The process of expanding the mask and testing all available addresses is repeated until either a test match is found or a user defined mask limit is reached. If a match is found, then the egress interface is mapped onto the intermediate system node in the centralized server database 42. Once the path has been defined, metric tests are run on each intermediate system hop in the path to characterize the performance of the entire path. This performance is gauged on a weighted scale of the results of a series of tests, which may include response time, number of hops, available bandwidth, jitter, throughput, and reliability. New methods may be added in the future by simply defining the test method and adding the weight of the results to the scale. The metric test results for each intermediate system hop in the path are stored in centralized server database. This process is repeated over time for each network in the list on all data collectors 90 in the autonomous system 80. The final results for all networks tested by a single data collector are combined so that all duplicate instances of an intermediate system in the paths known by that data collector are collapsed into a single instance in a tree structure. The root of this tree data structure is the data collector node itself with each intermediate system being topographically represented by a single node in the tree. Metrics are represented in the database by a vector between nodes that is calculated based on a weighted scale of metric types. The length of the vector is determined by the results of the metric tests. The database may optionally store the unprocessed metric results for the intermediate system node as well.

2.2.2 Building a Tree of Internet Routing Policy

The results from all data collectors 90 are transferred to a central database server 40. The central server 40 interprets the results by finding nodes that represent the same intermediate system in the different trees. Intermediate systems nodes are determined to be duplicated across multiple tree data structures when an IP address for an intermediate system node in one collector's tree exactly matches an IP address for an intermediate system node in another data collector's tree. Nodes determined to be duplicated between trees are merged into a single node when the trees are merged into the final topology graph data structure.

2.2.3 Determining Desired Routing Policy for Points on the Internet

When routing control device 20 queries the central server 40, the central server 40 supplies the path metrics used by the routing control device 20 in the path selection process based on the routing control device's location in an autonomous system 80. If the central server 40 has not already mapped the location of the routing control device 20 in the autonomous system 80, the routing control device 20 must determine its path into the autonomous system. To accomplish this, the routing control device 20 tests the path to each data collector 90 in the autonomous system 80 and supplies the results to the central server 40. The central server 40 analyzes these results to find an intersecting node in the path to the data collectors 90 and the autonomous system topology stored in the centralized database 42. Once the location of the routing control device 20 is known, the centralized server 40 may respond to path and metrics requests for destination networks made by the routing control device 20. Once supplied, the path and metrics information may be used as part of the route selection process by the routing control device 20. Once the routing control device 20 has selected the best path, a route is injected into the routing system 30 as specified in section 1.2.2.

What is claimed is:

1. A method facilitating the distribution of traffic flows across a plurality of routing peers, the traffic flows transmitted from a first computer network to hosts associated with respective destination networks, and wherein there is at least one path from the first computer network to each destination network, the method comprising the steps of monitoring traffic flows from a first computer network to a plurality of respective destination networks;

generating an ordered list of destination networks based on a traffic flow statistic value associated with each destination network, for each destination network in the ordered list, associating the routing peer(s) having reachability to the destination network; and iteratively performing a load balancing cycle until all destination networks have been assigned a routing peer, the load balancing cycle comprising:

for a first routing peer:

selecting the first unassigned destination network to which the first routing peer has reachability and assigning the selected destination network to the first routing peer; and setting a traffic flow weighting value to the traffic flow statistic value associated with the selected destination network;

for each subsequent routing peer:

selecting the first unassigned destination network to which the routing peer has reachability;

assigning the selected destination network to the routing peer;

repeating the selecting step until the traffic flow statistic values associated with the selected destination network(s) aggregate beyond a threshold level derived from the traffic flow weighting value; and assigning the selected destination network(s) to the routing peer.

2. The method of claim 1 wherein the selecting step for each subsequent routing peer is repeated until the traffic flow statistic values associated with the selected destination network(s) aggregate to within a threshold range from the traffic flow weighting value.

3. The method of claim 1 or 2 further comprising applying the paths assigned to each destination network to a routing system.

4. The method of claim 1 or 2 further comprising the steps of monitoring utilization of the plurality of routing peers operably connected to the first computer network; and and wherein the load balancing operation is conditioned on utilization of at least one routing peer exceeding a predetermined threshold level.

5. The method of claim 4 wherein the threshold level is a threshold percentage of the utilization capacity associated with each routing peer.

6. The method of claim 1 or 2 further comprising the steps of monitoring utilization of a selected routing peer operably connected to the first computer network; and and wherein the load balancing operation is conditioned on utilization of the selected routing peer exceeding a predetermined threshold level.

7. The method of claim 6 wherein the threshold level is a threshold percentage of the utilization capacity associated with the selected routing peer.

8. The method of claim 1 or 2 further comprising the steps of before performing the load balancing steps, filtering the ordered destination networks against a predefined list of destination networks.

9. The method of claim 1 or 2 further comprising the steps of before performing the load balancing steps, filtering the routing peer(s) associated with each destination network.

10. The method of claim 9 wherein the filtering step is performed to filter out invalid routing peers.

11. The method of claim 9 further comprising the step of identifying a routing peer associated with a destination network during a higher priority process, and, wherein the filtering step is performed to filter out all other routing peers if a routing peer associated with a higher priority process is identified.

12. The method of claim 9 wherein the filtering step is performed to filter out routing peers associated with paths having a hop count variance greater than a threshold value from the shortest path to the destination network.

13. The method of claim 1 or 2 further comprising the step of associating at least one routing system to a group; and wherein the ordered list of destination networks in the generating step comprises an ordered list of destination networks to which at least one routing system in the group has reachability;

and wherein, for each destination network in the ordered list, associating the routing peer(s), operably connected to at least one routing system in the group, having reachability to the destination network.

14. The method of claim 1 or 2 further comprising the step of defining at least one subnet of at least one destination network;

wherein the monitoring step comprises monitoring traffic flows from a first computer network to a plurality of respective destination networks and/or defined subnets of the destination networks;

wherein the generating step comprises generating an ordered list of destination networks and/or defined subnets of the destination networks based on a traffic flow statistic value associated with each destination network or subnet of the destination network; and wherein the load balancing cycle is iteratively performed on all network destinations and/or defined subnets of the network destinations.

15. A method facilitating the distribution of traffic flows across a plurality of routing peers, the traffic flows transmitted from a first computer network to hosts associated with respective destination networks, and wherein there is at least one path from the first computer network to each destination network, the method comprising the steps of monitoring traffic flows from a first computer network to a plurality of respective destination networks;

generating an ordered list of destination networks based on a traffic flow statistic value associated with each destination network, for each destination network in the ordered list, associating the routing peer(s) having reachability to the destination network; and iteratively performing a load balancing cycle until all destination networks have been assigned a routing peer, the load balancing cycle comprising:

for a first routing peer:
    selecting the first unassigned destination network to which the first routing peer has reachability and assigning the selected destination network to the first routing peer; and
    setting a traffic flow weighting value to the traffic flow statistic value associated with the selected destination network;

for each subsequent routing peer:
    selecting the first unassigned destination network to which the routing peer has reachability and assigning the selected destination network to the routing peer; and,
    if the traffic flow statistic value associated with the assigned destination network is below a threshold level derived from the traffic flow weighting value, then:
        selecting the next unassigned destination network to which the routing peer has reachability, and assigning the selected destination network, if the traffic flow statistic values associated with previously assigned destination networks and the next destination network aggregate below a maximum threshold derived from the traffic flow weighting value; and
        repeating the selecting step and conditional assigning step until the traffic flow statistic values associated with the selected destination network(s) aggregate beyond a lower threshold value derived from the traffic flow weighting value.

16. A method facilitating the distribution of traffic flows across a plurality of routing peers, the traffic flows transmitted from a first computer network to respective destination hosts, wherein each destination host is associated with a destination network, and wherein there is at least one path from the first computer network to each destination network, the method comprising the steps of monitoring traffic flows from a first computer network to a plurality of respective destination networks;

generating an ordered list of destination networks based on a traffic flow statistic value associated with each destination network, for each destination network in the ordered list, associating the routing peer(s) having reachability to the destination network; wherein each routing peer has a cost model associated therewith, the cost model comprising at least one price tier including a tier capacity and a fill priority;

selecting all routing peers having a price tier associated with the highest fill priority and, for the selected routing peers, iteratively performing a load balancing cycle until either all destination networks have been assigned a routing peer or all routing peers have been assigned up to their respective tier capacities, the load balancing cycle comprising:

for a first routing peer:
    selecting the first unassigned destination network to which the first routing peer has reachability and assigning the selected destination network to the first routing peer; and
    setting a traffic flow weighting value to the traffic flow statistic value associated with the selected destination network;

for each subsequent routing peer:
    selecting the first unassigned destination network to which the routing peer has reachability;
    repeating the selecting step until the traffic flow statistic values associated with the selected destination network(s) aggregate beyond a threshold level derived from the traffic flow weighting value; and
    assigning the selected destination network(s) to the routing peer;

selecting all routing peers having a price tier associated with the next highest fill priority and iteratively performing the load balancing cycle until either all destination networks have been assigned a routing peer or all routing peers have been assigned up to their respective tier capacities; and repeating the above selecting step for all fill priorities.

17. The method of claim 16 further comprising the step of assigning a fill priority to a price tier based on the cost of the price tier relative to the respective costs of all price tiers corresponding to all associated routing peers.

18. The method of claim 16 wherein the selecting step for each subsequent routing peer is repeated until the traffic flow statistic values associated with the selected destination network(s) aggregate to within a threshold range from the traffic flow weighting value.

19. The method of claim 16 or 18 further comprising the step of
applying the paths assigned to each destination network to a routing system.

20. The method of claim 16 or 18 further comprising the steps of
monitoring utilization of the plurality of routing peers operably connected to the first computer network; and
and wherein the load balancing operation is conditioned on utilization of at least one routing peer exceeding a predetermined threshold level.

21. The method of claim 20 wherein the threshold level is a threshold percentage of the utilization capacity associated with each routing peer.

22. The method of claim 16 or 18 further comprising the steps of
monitoring utilization of a selected routing peer operably connected to the first computer network; and
and wherein the load balancing operation is conditioned on utilization of the selected routing peer exceeding a predetermined threshold level.

23. The method of claim 22 wherein the threshold level is a threshold percentage of the utilization capacity associated with the selected routing peer.

24. The method of claim 16 or 18 further comprising the steps of
before performing the load balancing steps, filtering the ordered destination networks against a predefined list of destination networks.

25. The method of claim 16 or 18 further comprising the steps of
before performing the load balancing steps, filtering the routing peer(s) associated with each destination network.

26. The method of claim 25 wherein the filtering step is performed to filter out invalid routing peers.

27. The method of claim 25 further comprising the step of
identifying a routing peer associated with a destination network during a higher priority process, and, wherein the filtering step is performed to filter out all other routing peers if a routing peer associated with a higher priority process is identified.

28. The method of claim 25 wherein the filtering step is performed to filter out routing peers associated with paths having a hop count variance greater than a threshold value from the shortest path to the destination network.

29. The method of claim 16 or 18 further comprising the step of associating at least one routing system to a group; and wherein the ordered list of destination networks in the generating step comprises an ordered list of destination networks to which at least one routing system in the group has reachability;

and wherein, for each destination network in the ordered list, associating the routing peer(s), operably connected to at least one routing system in the group, having reachability to the destination network.

30. The method of claim 16 or 18 further comprising the step of defining at least one subnet of at least one destination network;

wherein the monitoring step comprises monitoring traffic flows from a first computer network to a plurality of respective destination networks and/or defined subnets of the destination networks;

wherein the generating step comprises generating an ordered list of destination networks and/or defined subnets of the destination networks based on a traffic flow statistic value associated with each destination network or subnet of the destination network; and wherein the load balancing cycle is iteratively performed on all network destinations and/or defined subnets of the network destinations.

* * * * *